US012347409B1

(12) United States Patent
Venti et al.

(10) Patent No.: US 12,347,409 B1
(45) Date of Patent: Jul. 1, 2025

(54) SYSTEMS AND METHODS FOR CONVERTING MUSIC INTO SEGMENTED DIGITAL ASSETS FOR DYNAMIC USES IN DIGITAL EXPERIENCES

(71) Applicant: LOOK SHARP LABS, INC., La Mesa, CA (US)

(72) Inventors: Nicholas L. Venti, La Mesa, CA (US); Tyson S. McDowell, La Mesa, CA (US); Markus Cremer, La Mesa, CA (US)

( * ) Notice: Subject to any disclaimer, the term of this patent is extended or adjusted under 35 U.S.C. 154(b) by 835 days.

(21) Appl. No.: 17/342,400

(22) Filed: Jun. 8, 2021

(51) Int. Cl.
*G10H 1/00* (2006.01)
*G10G 1/00* (2006.01)

(52) U.S. Cl.
CPC ............. *G10H 1/0025* (2013.01); *G10G 1/00* (2013.01); *G10H 2210/061* (2013.01); *G10H 2240/131* (2013.01)

(58) Field of Classification Search
CPC ........... G10H 1/0025; G10H 2210/061; G10H 2240/131; G10G 1/00
See application file for complete search history.

(56) References Cited

U.S. PATENT DOCUMENTS

| | | | | |
|---|---|---|---|---|
| 7,637,424 | B2 | 12/2009 | Silverbrook | B41J 3/445 |
| 7,730,216 | B1 | 6/2010 | Issa | H04L 67/104 |
| 8,819,030 | B1 | 8/2014 | Freed et al. | 707/748 |
| 8,928,727 | B1 | 1/2015 | Milligan | H04N 7/152 |
| 9,021,088 | B2 | 4/2015 | Bilinski et al. | G06F 17/30053 |
| 9,992,316 | B2 | 6/2018 | Hardi | H04M 1/6066 |
| 10,037,780 | B1 | 7/2018 | Roberts et al. | G11B 27/036 |
| 10,048,931 | B2 | 8/2018 | Vartakavi et al. | G06F 3/165 |
| 10,178,365 | B1 | 1/2019 | Singh et al. | H04N 9/802 |
| 10,333,876 | B2 | 6/2019 | Guthery et al. | H04L 51/10 |
| 10,474,422 | B1 | 11/2019 | Venti et al. | G06F 3/165 |
| 10,692,537 | B2 | 6/2020 | Eppolito | G04N 21/854 |
| 10,891,103 | B1 | 1/2021 | Venti et al. | G06F 3/165 |
| 10,956,945 | B1 | 3/2021 | Lewis | G06Q 30/0276 |

(Continued)

FOREIGN PATENT DOCUMENTS

| | | | |
|---|---|---|---|
| CN | 107076631 | 8/2017 | G10H 1/0025 |
| WO | WO2013166140 | 11/2013 | G06F 17/00 |
| WO | WO2014100893 | 7/2014 | G11B 27/031 |

OTHER PUBLICATIONS

U.S. Appl. No. 17/138,695, filed Dec. 30, 2020, Venti et al.

(Continued)

*Primary Examiner* — Jianchun Qin
(74) *Attorney, Agent, or Firm* — HAYES SOLOWAY P.C.

(57) ABSTRACT

Systems and methods for converting music into segmented digital assets for dynamic uses in digital experiences and discovery thereto are provided. In one example, a digital music file having at least one song is processed to identify segmented portions of the song, which are separated. The segmented portions of the song are analyzed to identify at least one musical quality of each of the segmented portions. An emotion, style, or vibe attribute is correlated to each of the segmented portions based on the musical quality identified. A composite soundtrack is constructed from the segmented portions by arranging at least a portion of the segmented portions based on the emotion, style, or vibe attribute correlated with each of the segmented portions. The composite soundtrack may be used within a digital entertainment experience.

17 Claims, 14 Drawing Sheets

(56) References Cited

U.S. PATENT DOCUMENTS

| | | | | |
|---|---|---|---|---|
| 11,169,770 | B1 | 11/2021 | Venti et al. | |
| 11,449,306 | B1 | 9/2022 | Venti et al. | G06F 3/165 |
| 11,481,434 | B1 | 10/2022 | Venti et al. | G06F 3/165 |
| 2005/0147256 | A1 | 7/2005 | Peters | G06F 16/683 |
| 2008/0270138 | A1 | 10/2008 | Knight | G06F 16/434 |
| 2009/0013263 | A1 | 1/2009 | Fortnow | G06Q 10/10 |
| 2009/0128335 | A1 | 5/2009 | Leung | G06Q 30/02 |
| 2009/0177303 | A1 | 7/2009 | Logan | |
| 2009/0187624 | A1 | 7/2009 | Brownholtz | G06Q 10/10 |
| 2009/0300670 | A1 | 12/2009 | Barish | H04N 7/17318 |
| 2010/0023578 | A1 | 1/2010 | Brant | G06F 16/639 |
| 2010/0031299 | A1 | 2/2010 | Harrang | H04N 21/4363 |
| 2010/0164956 | A1 | 7/2010 | Hyndman | G06Q 10/08 |
| 2010/0241711 | A1 | 9/2010 | Ansari | H04L 12/2812 |
| 2011/0161409 | A1 | 6/2011 | Nair | G06F 8/38 |
| 2011/0225417 | A1 | 9/2011 | Maharajh | G06Q 10/06 |
| 2011/0261149 | A1 | 10/2011 | Anuar | |
| 2012/0069131 | A1 | 3/2012 | Abelow | G06Q 30/0601 |
| 2012/0144343 | A1 | 6/2012 | Tseng | 715/834 |
| 2012/0144979 | A1 | 6/2012 | Tansley | G10H 1/0066 |
| 2012/0278387 | A1 | 11/2012 | Garcia | G06Q 50/01 |
| 2012/0304087 | A1 | 11/2012 | Walkin | 715/764 |
| 2013/0066964 | A1 | 3/2013 | Odio | G06Q 50/01 |
| 2013/0173742 | A1 | 7/2013 | Thomas | H04L 65/4076 |
| 2013/0297686 | A1 | 11/2013 | Bilinski | H04L 65/60 |
| 2014/0123041 | A1 | 5/2014 | Morse | 715/765 |
| 2014/0137144 | A1 | 5/2014 | Jarvenpaa | H04N 21/6582 |
| 2014/0181110 | A1 | 6/2014 | Imbruce et al. | G06F 17/30598 |
| 2014/0214848 | A1 | 7/2014 | Devkar et al. | G06F 17/30053 |
| 2014/0280498 | A1 | 9/2014 | Frankel | 709/203 |
| 2014/0289330 | A1 | 9/2014 | Liu | H04L 51/32 |
| 2014/0301573 | A1* | 10/2014 | Kiely | G11B 27/031 381/119 |
| 2014/0337761 | A1 | 11/2014 | Glass | H04L 65/403 |
| 2015/0089397 | A1 | 3/2015 | Gorod et al. | G06F 3/0482 |
| 2015/0169747 | A1 | 6/2015 | Hume | G06F 16/686 |
| 2015/0193516 | A1 | 7/2015 | Harb | G06Q 30/02 |
| 2015/0195620 | A1 | 7/2015 | Buchner | H04N 21/4788 |
| 2015/0215597 | A1 | 7/2015 | Xu | G11B 20/10527 |
| 2015/0242525 | A1 | 8/2015 | Perlegos | G06F 16/972 |
| 2015/0318020 | A1 | 11/2015 | Pribula | |
| 2015/0339300 | A1 | 11/2015 | Stoddard, II et al. | G06F 17/30056 |
| 2015/0373065 | A1 | 12/2015 | Holmquist | H04L 65/403 |
| 2016/0149956 | A1 | 5/2016 | Birnbaum | H04L 63/20 |
| 2016/0173683 | A1 | 6/2016 | Abreu | H04L 51/24 |
| 2016/0196105 | A1 | 7/2016 | Vartakavi et al. | G06F 3/165 |
| 2016/0217328 | A1 | 7/2016 | Yanai | G06K 9/00671 |
| 2016/0224311 | A1 | 8/2016 | Touch | H04L 65/4076 |
| 2016/0227115 | A1 | 8/2016 | Bin Mahfooz et al. | H04N 5/23245 |
| 2016/0246452 | A1 | 8/2016 | Bockhold | G06F 3/0488 |
| 2016/0248840 | A1 | 8/2016 | Bockhold | H04L 51/32 |
| 2016/0300594 | A1 | 10/2016 | Allen | G11B 27/031 |
| 2017/0024399 | A1 | 1/2017 | Boyle | G06F 16/903 |
| 2017/0154615 | A1 | 6/2017 | Serletic et al. | G01H 1/00 |
| 2017/0289202 | A1 | 10/2017 | Krasadakis | H04L 65/1069 |
| 2017/0372525 | A1 | 12/2017 | Rosenthal et al. | G06T 19/006 |
| 2018/0053510 | A1 | 2/2018 | Kofman | |
| 2018/0103292 | A1 | 4/2018 | Zheng | A61B 5/0077 |
| 2018/0152736 | A1 | 5/2018 | Alexander | |
| 2019/0045252 | A1 | 2/2019 | Lyons et al. | H04N 21/2668 |
| 2019/0051272 | A1* | 2/2019 | Lewis | G06F 16/68 |
| 2019/0163830 | A1 | 5/2019 | DeLuca | G06F 17/30867 |
| 2019/0197589 | A1 | 6/2019 | Singh et al. | G06Q 30/0279 |
| 2019/0286720 | A1 | 9/2019 | Agrawal et al. | G06F 17/30268 |
| 2022/0319478 | A1* | 10/2022 | Lyske | G10H 1/38 |

OTHER PUBLICATIONS

U.S. Appl. No. 16/699,330, filed Nov. 29, 2019, Venti et al.
Notice of Allowance issued in U.S. Appl. No. 15/490,800, dated Aug. 29, 2019 (9 pgs).
Office Action issued in U.S. Appl. No. 15/490,800, dated Jun. 27, 2019 (18 pgs).
Office Action issued in U.S. Appl. No. 15/490,800, dated Sep. 7, 2018 (18 pgs).
Wu et al., Bridging Music and Image via Cross-Modal Ranking Analysis; IEEE, Jul. 2016; 14 pgs.
Notice of Allowance issued in U.S. Appl. No. 16/592,549, dated Sep. 9, 2020 (10 pgs).
Office Action issued in U.S. Appl. No. 16/592,549, dated Aug. 21, 2020 (9 pgs).
Office Action issued in U.S. Appl. No. 16/592,549, dated May 29, 2020 (35 pgs).
Maestre et al., Enriched Multimodal Representations of Music Performances: Online Access and Visualization; IEEE; 2017; 11 pages.
Segmentino, https://code.soundsoftware.ac.uk/projects/segmenter-vamp-plugin, accessed Jul. 8, 2021, 3 pages.
Ren et al., "Automatic Music Mood Classification Based on Timbre and Modulation Features" IEEE, pp. 236-246, Apr. 29, 2015, abstract, 3 pages.
Zhao, "Explore Music World: Categorize Music by Mood", CCTP 607 Spring 2020, Apr. 26, 2020, https://blogs.commons.georgetown.edu/cctp-607-spring2020/2020/04/26/explore-music-world-categorize-music-by-mood 10 pages.
Notice of Allowance issued in U.S. Appl. No. 17/138,695, dated Jul. 9, 2021 (18 pgs).
Oyang et al., Characterizing the Service Usage of Online Video Sharing System: Uploading vs. Playback; IEEE; 2016, 7 pages.
Xing et al., Proximiter: Enabling Mobile Proximity-Based Content Sharing on Portable Devices; 2009 IEEE, 3 pages.
Belimpasakis et al., Home Media Atomizer: Remote Sharing of Home Content—without Semi-trusted Proxies; 2008 IEEE, 9 pages.
Pering et al., Face-to-Face Media Sharing Using Wireless Mobile Device; 2005, IEEE 8 pages.
Notice of Allowance issued in U.S. Appl. No. 17/520,579, dated May 11, 2022 (19 pgs).
Lee et al., Face-to-Face Media Sharing Using Wireless Mobile Devices; 2013, IEEE, 10 pages.
Office Action issued in U.S. Appl. No. 16/699,330, dated Feb. 17, 2022 (13 pgs).
Notice of Allowance issued in U.S. Appl. No. 16/699,330, dated Jun. 17, 2022 (33 pgs).
Notice of Allowance issued in U.S. Appl. No. 17/947,799, dated May 26, 2023 (11 pgs).
Hopmann et al., Virtual Shelf: Sharing music between people and devices, 2010, IEEE, 7 pages.
Office Action issued in U.S. Appl. No. 18/049,255, dated Aug. 18, 2023 (16 pgs).
U.S. Appl. No. 15/490,800, filed Apr. 18, 2017.
U.S. Appl. No. 16/592,549, filed Oct. 3, 2019.
U.S. Appl. No. 17/138,695, filed Dec. 30, 2020.
Office Action issued in U.S. Appl. No. 17/947,799, dated Feb. 2, 2023 (12 pgs).

* cited by examiner

10

| Emotion Vector | |
|---|---|
| Angry | High Energy, High Stress |
| Happy | High Energy, Low Stress |
| Relaxed | Low Energy, Low Stress |
| Sad | Low Energy, High Stress |

| Logical Segments |
|---|
| Intro |
| Verse |
| Chorus |
| Bridge |
| Outro |

| Intensity Slope |
|---|
| Up |
| Flat |
| Down |

| Energy Scalar | | Stress Scalar | |
|---|---|---|---|
| Extremely High | 14 | Extremely High | 14 |
| | 13 | | 13 |
| | 12 | | 12 |
| | 11 | | 11 |
| High | 10 | High | 10 |
| | 9 | | 9 |
| | 8 | | 8 |
| | 7 | | 7 |
| Low | 6 | Low | 6 |
| | 5 | | 5 |
| | 4 | | 4 |
| | 3 | | 3 |
| | 2 | | 2 |
| Extremely Low | 1 | Extremely Low | 1 |

FIG. 3

SYSTEMS AND METHODS FOR CONVERTING MUSIC INTO SEGMENTED DIGITAL ASSETS FOR DYNAMIC USES IN DIGITAL EXPERIENCES

FIELD OF THE DISCLOSURE

The present disclosure is generally related to digital music experiences and more particularly is related to systems and methods for converting music into segmented digital assets for dynamic uses in digital experiences.

BACKGROUND OF THE DISCLOSURE

Music is an integral part of most entertainment experiences, and especially digital entertainment experiences. Within films, electronic games, or other interactive entertainment experiences, music is often used as a soundtrack in order to enhance the entertainment experience for the user. For example, within electronic games specifically, such as video games or computer games, a music-based soundtrack is often used to highlight the experience of the game, such as by using fast paced and powerful music to amplify intense sequences of the game, or by providing calming, relaxed music to de-emphasize less intense sequences of the game.

With these electronic games, the soundtrack used is almost always created originally, from scratch, by musicians and artists who are hired by the game developers. The game developers provide the musicians with instructions or direction on the specific type or style of music, or characteristics of the music that they're seeking for the game, and the musician composes new music for the game developer's consideration. The music generated is specifically composed to fit within one or more sequences of a game. The game developer can then select the newly-composed music to be correlated to specific parts of the game, for example, by hardcoding the music into the game at a particular timeframe or to correspond to a particular setting in the game, such that the music plays at the desired timeframe or setting.

Naturally, composing new, original music for each new electronic game is a time-consuming endeavor which often adds substantially to the costs of producing a game. While it would be convenient to use music that is already available, such as tracks or compositions recorded by well-known artists, this type of music is not used in electronic games for various reasons. For one, the expense of licensing the music from the artist or music label is often prohibitive. Additionally, this type of music cannot be easily added to a game without substantial modifications and formatting to the song itself in order to tailor the song to the part or parts of the game.

Thus, a heretofore unaddressed need exists in the industry to address the aforementioned deficiencies and inadequacies.

SUMMARY OF THE DISCLOSURE

Embodiments of the present disclosure provide a system and method for converting music into segmented digital assets for dynamic uses in a digital entertainment experience. Briefly described, in architecture, one embodiment of the method, among others, can be broadly summarized by the following steps: uploading at least one digital music file to a computerized system, the at least one digital music file having at least one song; processing, with a computerized processor of the computerized system, the at least one digital music file to identify segmented portions of the at least one song; separating the at least one song into the segmented portions; analyzing the segmented portions of the at least one song to identify at least one musical quality of each of the segmented portions, wherein an emotion, style, or vibe attribute is correlated to each of the segmented portions based on the at least one musical quality identified; and constructing a composite soundtrack from the segmented portions by arranging at least a portion of the segmented portions based on the emotion, style, or vibe attribute correlated with each of the segmented portions.

The present disclosure can also be viewed as providing systems or methods of providing a composite soundtrack for use in a digital entertainment experience. In this regard, one embodiment of such a method, among others, can be broadly summarized by the following steps: providing a computerized system having a database storing a plurality of digital music files' time-index attributes, each of the plurality of digital music files having at least one song; selecting, by a user, one or more songs to be used to generate a soundtrack for the digital entertainment experience; mapping a plurality of events within the digital entertainment experience to a plurality of emotion, style, or vibe attributes, respectively; constructing a composite soundtrack from segmented portions of the one or more songs, the segmented portions being selected based on at least one musical quality therein, wherein at least one of the segmented portions is correlated to each of the plurality of emotion, style, or vibe attributes to form the composite soundtrack from an arrangement of the segmented portions; and outputting the composite soundtrack to be played within the digital entertainment experience.

Optionally, in one example, playing of the soundtrack may connects the user back to the original song form which a segment of the song, such as a segment currently playing, came from.

The present disclosure can also be viewed as providing systems or methods of converting music into segmented digital assets for dynamic uses in a digital entertainment experience. In this regard, one embodiment of such a method, among others, can be broadly summarized by the following steps: processing, with a computerized processor of the computerized system, at least a first digital music file or a stream of the first digital music file to identify segmented portions of at least one song within the first digital music file; separating the at least one song into the segmented portions; analyzing the segmented portions of the at least one song to identify at least one musical quality of each of the segmented portions, wherein an emotion, style, or vibe attribute is correlated to each of the segmented portions based on the at least one musical quality identified; processing, with the computerized processor of the computerized system, at least a second digital music file or a stream of the second digital music file to identify segmented portions of at least one song within the second digital music file which matches an emotion, style, or vibe attribute of at least one segmented portion of the first digital music file; and constructing a composite soundtrack from the segmented portions of the first and second digital music files by arranging the segmented portions based on the emotion, style, or vibe attribute correlated with each of the segmented portions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a diagrammatic illustration of music tagging base taxonomy used within the system for converting music into segmented digital assets for dynamic uses in digital experiences, in accordance with the first exemplary embodiment of the present disclosure.

DETAILED DESCRIPTION

To improve over the shortcomings, the present disclosure is directed to systems and methods for converting music into segmented digital assets for dynamic uses in digital experiences, such as computer games and video games. As will be described, the systems and methods of the present disclosure effectively allow for any existing song, track, or other musical composition, such as songs or tracks produced by any mainstream or independent, unsigned, unrepresented artist, to be used to build a composite soundtrack for an entertainment experience, which may be referred to herein as 'dynamic soundtracking.' In one example, this dynamic soundtrack is a replacement for conventionally composed soundtracks for digital entertainment. In another example, the dynamic soundtrack is not merely a replacement soundtrack for conventional soundtracks in digital entertainment, but rather, it is a dynamic composition made from segments which are dynamically formed into a composite soundtrack which can be specifically tailored, either manually or automatically, to the events within a digital entertainment experience.

It is noted that the subject disclosure can be used with any digital entertainment experience, including interactive entertainment, such as video or computer games, e.g., Xbox, PlayStation, Nintendo, downloadable computer games for PC or IOS, streaming computer games, or any combination thereof, as well as non-interactive visual entertainment, such as films, movies, videos, shorts, clips, etc. For clarity in disclosure, the subject invention is described herein relative to the gaming industry, namely with computer or video games since it offers substantial benefits to the gaming industry where soundtracks are used to accompany the visual interaction a user experiences with the events in a video game or computer game. However, it is not limited to only this use, as the present disclosure can be used with any digital entertainment experience including but not limited to dynamic soundtracking a person having a physical fitness experience (with a device such as a FITBIT® or smartphone aware of the user's movements and intensity), a digital advertisement such that the composite soundtrack adapts to the viewer, and/or online streaming such that the viewers can select their own soundtrack to play during the viewing. Any other digital experience not specifically mentioned herein is also considered within the scope of the present disclosure.

Figure 1:
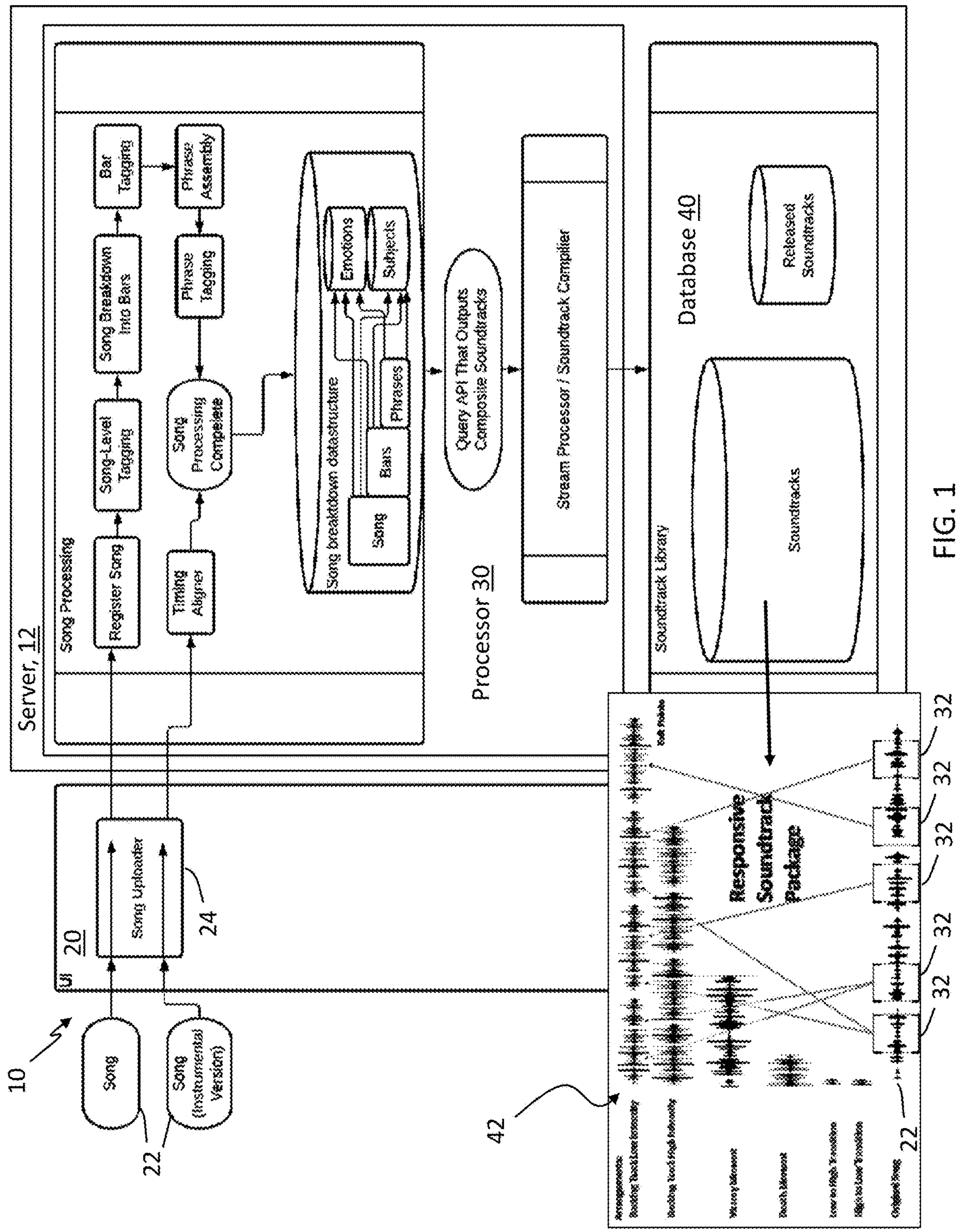
FIG. 1 is a diagrammatic illustration of a system for converting music into segmented digital assets for dynamic uses in digital experiences, in accordance with a first exemplary embodiment of the present disclosure.
Figure 2:
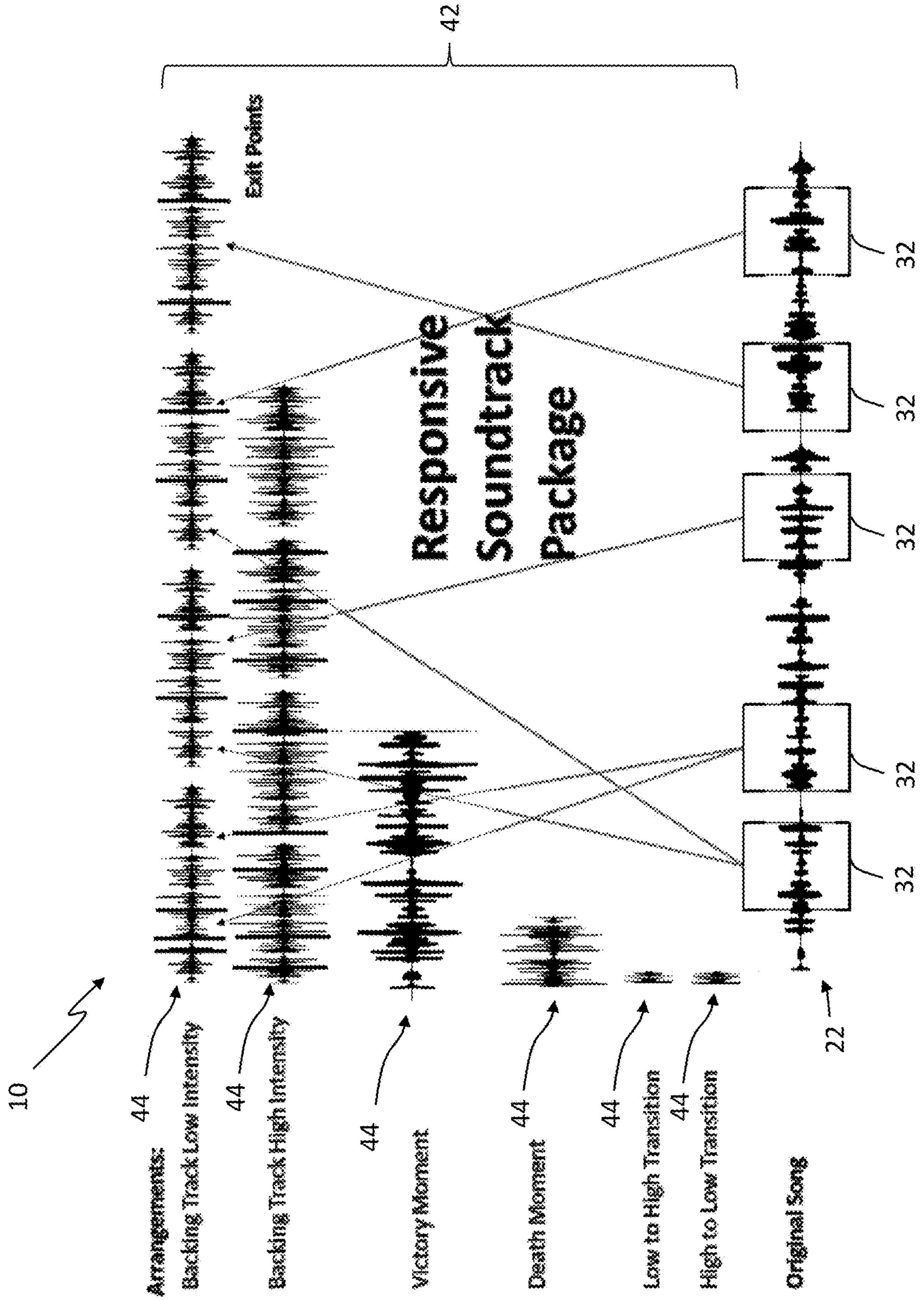
FIG. 2 is a diagrammatic illustration of a segmented musical work within the system for converting music into segmented digital assets for dynamic uses in digital experiences, in accordance with the first exemplary embodiment of the present disclosure.

As a general overview of the subject disclosure, FIG. 1 is a diagrammatic illustration of a system for converting music into segmented digital assets for dynamic uses in digital experiences 10, in accordance with a first exemplary embodiment of the present disclosure. FIG. 2 is a diagrammatic illustration of a segmented musical work within the system for converting music into segmented digital assets for dynamic uses in digital experiences 10. With reference to FIGS. 1-2, the system for converting music into segmented digital assets for dynamic uses in digital experiences 10, which may be referred to herein as 'system 10', is implemented within a computing architecture which has a computing device or server 12 in communication with a user interface 20, where the server 12 includes a processor 30, one or more databases 40, and various input/output connections for communicating data.

The user interface (UI) 20 includes a song uploading tool which is configured to receive the digital file upload, or porting-in of a third-party hosted music stream, of a song or musical work 22 from a user, which allows for any current or former musical artist to submit his or her musical work 22 for use as a soundtrack. The musical work 22 may include individual songs, full albums, collections of musical works, or any other type of musical compositions, in any genre, style, or digital format. The musical artist may be any artist or representative thereof, such as well-known or popular musical acts of the present or past, or their labels or rights holders, indie artists, underground artists, independent artists, etc., regardless of their success, popularity, or fame. The musical work 22 may be uploaded or otherwise communicated from the user's computing device or database through the song uploading and stream-linking interface 24 in the UI 20 with any known computing technique, whereby a digital audio file, e.g., M4A, MP3, MP4, ACC, FLAC, WAV, WMA, stream, etc., is received within a server or other computerized system of the subject invention. As an alternative to an upload of the digital musical file, the upload interface 24 may allow for pointing to the digital music file in another database, e.g., where metadata can point to existing stream locations such as SPOTIFY®, such that the digital musical file itself is not uploaded in the system.

Once the musical work is uploaded or streamed to the server 12, the processor 30 processes the musical work 22 to identify portions of the musical work 22 which can be segmented and assigned time-index attributes, and then separates those segmented portions 32 from one another. This process of segmenting allows for the entirety or a portion of the musical work to be separated or parsed into one or more smaller portions based on musical differences between the segments 32. For example, a part of a song with a relatively soft, melodic clean guitar picking may be segmented from a chorus of the song, which is faster, louder, and has a distorted guitar sound. Naturally, there may be a large number of ways to segment a given song, including by part of the song (intro, verse, chorus, bridge, outro, etc.), by musical consistency within the segment such as that musical consistency is substantially different than in neighboring segments (musical compositional themes), multi-variant-derived intensity such as via onset density and variation thereto, specific or composite dynamic ranges imputing a level, slope up, or slope down of singular or composite features, by volume, beat, tone, tempo, or timbre, by the presence or absence of vocals, by the presence or absence of certain instruments, by the key of the song, by the chords or chord progression of a song, a natural starting or stopping point of a portion of the song (loopability), or any other characteristic of the song, any combination of which may be used.

Once identified, the processor 30 then separates each of these segmented portions 32 from one another, such that there is an identifiable beginning and end to each segment. For example, FIG. 2 illustrates the original musical work 22 being segmented into different segmented portions 32. Separation or segmentation of the portions may include digitally splitting the musical work 22 file into separated files which correspond to each segment 32, extracting the portions of the digital files corresponding to each segment and generating new files for each segmented portion 32, and/or leaving the original digital file complete but identifying the locations within the file for the beginning and ending points of each segment 32. This breakdown of the musical work 22 may include various processes where the song, a bar thereof, or a phrase thereof, is broken down based on style, vibe, subject, or emotion, as described below. It is noted that not all portions of a musical work need to be used as useable segmented portions 32, as there may be parts of the work which are omitted from use. However, parts of the musical work which are not anticipated to be used may still be identified as segmented portion 32.

The segmented portions 32 are analyzed to identify it's musical quality, e.g., the character or feel of the segment 32, such that it can be categorized with one or more particular emotion, style, or vibe attributes, i.e., perceived or anticipated emotional reactions, moods, or perceived atmospheres that a human would have when hearing the segment. Continuing with the previous example, the soft, melodic verse with clean guitar picking may be identified to have a low intensity musical quality which correlates to a happy emotion, style, or vibe attribute, whereas the louder, faster chorus with distorted guitar may be characterized as having a higher intensity musical quality which correlates to an angry emotion, style, or vibe attribute. Similar qualities can be correlated to a style or vibe of a particular song.

There may be many types of musical qualities which can be identified with a segment, such as, for example, low intensity or low energy, high intensity, or high energy, high or low stress, an intensity slope that increases, decreases, or is constant, emotion state, emotion vector, music complexity consistency, dynamic music consistency, etc. Similarly, there may be many types of identifiable emotion, style, or vibe attributes, and there are many ways to correlate a particular emotion, style, or vibe attribute with the musical quality. For instance, emotion attributes may include angry, content, happy, sad, relaxed, stressed, nervous, confident, scared, brave, etc., among many others, whereas style attributes may include aggressive, soft, playful, and grating, among many others, and vibe attributes may include relaxed, intense, chill, or anxious among many others. Collectively or individually, these emotion, style, or vibe attributes may be correlated with the musical quality in various ways. For example, musical qualities of high energy, high stress may be correlated with the emotion, style, or vibe attribute of angry, whereas high energy, low stress may be correlated with being happy, and low energy, low stress may be correlated with relaxed, whereas low energy, high stress may be correlated with sad. Each segmented portion may be identified with a musical quality such that each segment can be assigned an emotion, style, or vibe attribute.

Once the segments 32 of the musical work 22 are matched with the identified musical qualities and the emotion, style, or vibe attribute, the segments 32 may be combined or arranged into a composite soundtrack 42. It is preferable to eliminate gaps within the soundtrack, i.e., the inadvertent absence of music, such that the segments 32 are stringed together to form a cohesive composite soundtrack. Further, the "loop ability" and "loop non-repetitiveness" can be analyzed and support the overall quality of the arranged soundtrack element. This composite soundtrack 42 may utilize some, all, or any number of the identified segments from the musical work 22, or in many situations, it may use segments 32 from a plurality of different musical works 22 which are arranged together into a soundtrack. The arrangement of the composite soundtrack 42 may be based on various criteria, but commonly, it may be arranged such that the musical qualities and/or the emotion, style, or vibe attributes of the segments 32 correspond to or match events within a particular digital entertainment experience.

As an example of a composite soundtrack formed from a plurality of songs, a computerized processor of a computerized system may process at least a first digital music file or a stream of the first digital music file to identify segmented portions of at least one song within the first digital music file. The at least one song may be separated into the segmented portions. The segmented portions of the at least one song are analyzed to identify at least one musical quality of each of the segmented portions, wherein an emotion, style, or vibe attribute is correlated to each of the segmented portions based on the at least one musical quality identified. Then, the computerized processor of the computerized system processes at least a second digital music file or a stream of the second digital music file to identify segmented portions of at least one song within the second digital music file which matches an emotion, style, or vibe attribute of at least one segmented portion of the first digital music file. A composite soundtrack may then be constructed from the segmented portions of the first and second digital music files by arranging the segmented portions based on the emotion, style, or vibe attribute correlated with each of the segmented portions. This process may be iterative with any number of additional songs, where the system iteratively searches for additional digital music files which have segments which match the emotion, style, or vibe attribute of at least one segmented portion of the first or second digital music files, such that the composite soundtrack can be constructed from segmented portions of the first, second, and additional digital music files. This allows for a situation where a user, or the system itself, can explore and easily discover lots of segments that can work with another segment to achieve enough music to fill a soundtrack from a single segment, e.g., a "very interesting" segment, that itself may be too short to comprise a soundtrack alone.

FIG. 2 provides a graphical illustration of this process, where the composite soundtrack 42 may be formulated to be used with a video game which has various events within game play, e.g., defeat, victory, battles, tasks, etc., and where the context of these events is linked to particular parts of the composite soundtrack 42. As shown, the segments 32 identified from the musical work 22 are arranged into various sub-arrangements 44 which correspond to a selected or desired musical quality or emotion, style, or vibe attribute that the game developer desires. For instance, there may be sub-arrangements 44 for a backing track with low intensity and high intensity, a victory moment, a death moment, and various transitions, among others. The segments 32 are reconstructed or arranged into an order to match the desired quality of the sub-arrangement 44, and the sub-arrangements 44 are keyed to the events in the game, such that when a particular event occurs within the video game, the corresponding sub-arrangement 44 is played.

As an illustration, the backing track with low intensity may be played when a video game player is in the midst of a non-eventful game play, e.g., travel from one location to another. When the player encounters an enemy and battles them, the backing track with high intensity may be played. If the player is victorious, the victory moment sub-arrangement 44 may be played, and if the player is defeated, the death moment sub-arrangement 44 may be played. Thus, as can be seen, each game or other entertainment experience can be described by events or reasons to play a different soundtrack element, which effectively acts as a map to the use of a portion of the composite soundtrack 42. Keying or correlating the events of the video game to the specific quality or emotion of the sub-arrangement 44, allows the composite soundtrack 42 to be used throughout the game for all identified events, such that the player of the game hears the corresponding part of the composite soundtrack 42 when he or she encounters a particular location, time period, or interaction within the game. Thus, the system 10 is able to generate and output a composite soundtrack 42 which is correlated to, or responds to, the changing context events of the game being played as it is played.

When the composite soundtrack 42 is generated, it may be output from the system 10 in various methods. For instance, the composite soundtrack 42 may be downloadable by a developer and integrated into a game or other form of entertainment. It may also be downloadable by a user of the game, such that the user can select which soundtrack he or she prefers to have with the game. The composite soundtrack 42 may also be communicated with a query API, such that the composite soundtrack 42 can be directly streamed into any network-enabled game. Within the system 10, it may be desirable to use a soundtrack library which has one or more databases 40 which store previously-composed soundtracks and/or released soundtracks. This may allow developers or users to search for particular composite soundtracks 42.

In some situations, it may be desirable for the composite soundtrack 42 to be implemented as a static soundtrack, whereby the identified segments 32 of a musical work 22 are played when a corresponding event in the video game occurs, and the same segments 32 are played for their corresponding game events, respectively. However, the system is also capable of generating dynamic composite soundtracks. As each of the musical works 22 have the individual segments 32 thereof identified based on musical quality and emotion, style, or vibe attribute, and because the events of the game are also correlated or matched to a desired musical quality of emotion, style, or vibe attribute, it is possible to dynamically interchange virtually any compatible musical work 22 as a composite soundtrack 42 for a game. Thus, a user may enjoy the 'swapability' the system offers, where they can play the same video game, and the same events within that video game, with a new soundtrack time. In addition, the ability to stream a song from a third party streaming service direct from the experience can be supported.

The game developer or the user may have near unlimited variations in the soundtrack of the game, which in turn, can significantly affect the feel of game play. For instance, a player of a combat video game may be able to play a particular combat scene with classical music at one point in time, heavy metal music at a different time, or hip-hop music at yet another time, each of which can provide a different experience to the user. Additionally, the composite soundtrack 42 generated by the system may be implemented as a package or pack which includes the sub-arrangements 44 along with the original search criteria for contextual song replacement downstream. This can be implemented as "wrapper" code around a "compiled" package of music, or it can be implemented as a "wrapper" code that calls the stream engine real-time. This allows for the composite soundtracks 42 to be stored remote from the game itself but streamed to the local computing device on which a game is played.

It is noted that the composite soundtrack as played in each user session is saved and can be replayed, such that one could, as an example, play a video game and really enjoy the soundtrack experience, then play that soundtrack back while running or exercising to relive the gameplay as inspiration for their workout.

The disclosed system and method offer numerous benefits within the music industry and within the digital entertainment industry. At a base level, the system and method allow digital entertainment developers to move away from the conventional methods of composing soundtracks, e.g., where an artist is hired to compose a soundtrack from scratch specifically for the entertainment experience. Instead, these developers can use virtually any existing song from any artist, which saves the time and expense of composing new and original soundtracks. For the musician, the system and method allow for existing artist and songs to be utilized and integrated into more digital entertainment, which expands both the exposure of the artist or song, as well as his or her earning capacity based on additional licensing fees from the use of his or her music.

Moreover, since the system and method allow for the dynamic interchange of any compatible musical work into digital entertainment, the soundtrack for any particular game or video can be repeatably changed and refreshed such that the same gameplay can be used with different soundtracks to make for different playing experiences. This allows developers to keep their products enticing to existing customers for longer periods of time, and to attract new users for their products. For example, it may be possible for game players to "point" their game to music they like that already exists and the system 10 can restructure that song into a composite soundtrack to their gameplay real-time.

Another benefit of the disclosed system and method is it may allow existing game players to be exposed to new music. As a player is playing a game and hears a soundtrack that they enjoy, the player may be able to use the system 10 to identify the underlying artist or song used to generate that soundtrack. Accordingly, the system 10 may have a link or similar feature which links or electronically connects the player or user back to the artist, the original song, and/or a position within that original song which was played in the soundtrack. The player may then be able to listen to the song or purchase a copy of it, either through the system 10 directly or within a third-party database or application.

Segmentation:

As previously noted, segmentation of the musical work may occur using various techniques. For instance, segmentation may include a comparison of the similarity of musical features, predominantly in the spectral domain. A simple feature may be the energy contained in different frequency bands, and one representative example of these types of features is Mel Frequency Cepstral Coefficients (MFCCs). These features may be understood as a vector of numbers generated approximately every 10 milliseconds, which are representative of the timbral characteristics of the audio signal within the musical work. For a song having a given length, similarities in the long string of vectors which form the song are analyzed, such as by comparison to a distance metric or similar metric which can be plotted in a matrix that has the time offset of one feature vector i as compared to the time offset of another feature vector j, where i & j are offset counters using a distance function. This distance function could be Euclidean distance or some other suitable function. If the two vectors are similar, a low value is seen, whereas if the two vectors are different, a high value is seen. This is called a similarity matrix. It is then possible to observe shares of low values forming along the diagonal line of segments containing similar content. When a proper threshold is applied, it is possible to determine points in time where one segment ends and another segment begins.

Another approach for segmentation may include the use of a novelty measure, which determines, again on the string of vectors, the self-similarity of the vectors in a very short time window. If the vector values start to change dramatically, a segment boundary is introduced. This is more practical for algorithms that need to run under streaming conditions, or in memory constrained environments. However, if the underlying signal changes a lot, for example, as may be common in some forms of Jazz music, it is possible to have numerous very small segments. Both of these techniques, the novelty metric and similarity matrix, can be used in various combinations.

Another technique for segmentation may include calculating a chromagram, which is a spectrogram where the energies in the frequency bands of the song are mapped into one octave, and which describes the harmonic content of a musical signal. This method reflects mostly melodic and chord information of the song, but it is also possible to exploit rhythmic signal elements such as onset density over time, though given a lot of music is rhythmically similar in itself, this may have limited applicability.

Instead of these deterministic approaches, it may be more advantageous to use neural networks to conduct segmentation, where the neural net is fed either the music signal directly, or the output of a frequency transform, or a vector stream of features as described in the deterministic approaches. It may be advantageous for the neural net to be in the form of a recurrent neural net (RNN), as this architecture is good for capturing evolution and/or change over time. The neural network is then trained using manually created examples. With this approach, it is possible to create hundreds of thousands of segments and train the neural network to distinguish boundaries between these segments, or lack of boundaries within each segment.

The segments could be human annotated, or the output of a systemic approach as detailed previously. It is also possible to arbitrarily combine portions from separate songs, and call those boundaries, whereas each song itself in its sequence would be considered one segment. The few segment boundaries within the song would be considered false positives and is likely to be ignored as 'noisy data' by the neural network.

Once the existence and location of a segment within a song is determined, there are some post processing steps that can compare segments within a song to each other, and determine whether these are similar segments (e.g., multiple chorus or verse parts) or different. In this process, it is possible to apply a map of beats and bars to determine on which beat a segment begins or ends, to create loop-able material. For instance, beat and bar detection may utilize models where pulse frequency is determined over time in specific frequency bands, such as bass frequencies or high frequencies to determine the pulse of a bass drum or hi-hat. These frequencies determine a window, within which periodic energy increases are determined, ideally in the time domain to preserve temporal accuracy, to find the beat onset location. Meter (bar information, i.e., 3/4, 4/4, 6/8, etc.) is determined using again periodicities in the temporal energy envelop of individual select spectral bands but looking for a ratio of the meter lower than the beats, i.e., the estimated beat per minute (bpm) value. For example, if the algorithm determined a song at 120 bpm, and there is another frequency peak at 30 bpm, it is very likely that the song has a 4/4 meter, whereas a 40 bpm peak would indicate a 3/4 meter. Once meter and tempo of a song is identified, this information can be correlated with energy increases in the audio to create a beat grid, as previously described. It is then possible to take the segment boundaries, and try to align them with the beat grid, in most cases as simple as finding the closest beat or bar position. It is also possible to use trained neural networks to solve tempo detection tasks, which works generally better than other techniques, especially in situations where the music signal is different enough to thwart the signal processing-based approaches. Neural networks are much better at generalization and figuring out the gestalt of music. The downside is, neural networks often need substantial training material which needs to be generated, primarily manually.

Music Intake Process:

With reference again to FIGS. 1-2, the process of intaking music into the system 10 is further described. As generally identified in FIG. 1, the processing of the musical work 22 may include various functional blocks or tasks, such as registering the song, conducting song-level tagging, breaking down the song into bars and then tagging those bars, conducting phrase assembly and phrase tagging, and ensuring the correct timing alignment of the song. This process may be controlled by various task queues which correspond to functional steps within the process, where some of the tasks are completed automatically. For instance, as it relates to music intake, various tasks are loaded into queues, which may auto-complete without going through a task queue interface. These may include aligning the music file with the song with the track (when uploaded into an existing track), where the track is the selected final song and all logical tags surround the track, registering the track, tagging the track to identify metadata surrounding any level of logical data entity within the track, segmenting the track, and verifying the tagging of the track or segment.

In a preferred example, all tags are auto-generated, whereby all auto-generated tags are placed into an "Auto Tagged" database and the model/version used to generate the tag is stored. The same tag can be set by a user, or any number of model/version combos into a "Tag Log" and the system 10 or user set the "Selected Tag" from the set as the final associated with the actual entity. Areas of initial auto-tagging include: auto-structure tags (beats, bpm, bars), auto-segment tags (intro, verse, chorus, etc.), auto-point of interest tags (drops, high dynamic range over short time), auto-subject (based on lyrics within the time-bound of the entity), lyrical segments (time indexes of lyric blocks), and vocal presence flag.

To upload a song or point or link to a streamable song, the song uploader 24 can be embedded in multiple pages and be available to various account types, such as an artist, a team member, etc. The musical work 22 file uploaded may be transmitted from the local computing device to the system's 10 storage database. While various filetypes may be accepted, it may be possible to transcode WAV files. The song upload may be logged in a database of the system 10, where the upload ID (UID) of the upload itself is stored with the file. The uploaded song may then get presented for tagging and/or association. It may be possible to have an "Upload Into" folder structure for the artist, album, or track. Registration or association of the uploaded song may occur in two or more ways. If the song is uploaded into an existing track, that track ID is inherited, and the song is registered as the latest revision of the underlying song file for that track. If the track uploaded is already tagged, an open process to align the new song file with the existing song source being replaced may be used. This is referred to as an alignment process. Within the alignment process, the system opens the original song in the current song in parallel players. The original song is played to an identifiable place "key" and the current song is played to the same audible "key." A user may then align two songs via a time-offset value saved into the song version. However, if the song is not uploaded into an existing track, the system 10 assigns a new, unique track ID to the song. System 10 then presents a form to the user to fill in details, such as the name of the song, the artist, and the genre of the song, among other possible data.

Next, system tags at the track level. The first tagging occurs based on genre style or other common metadata associated with the song file. Next, first order tagging is done which includes emotion tagging, lyrics, and subject tagging. With emotion tagging, emotion vector and an intensity slope may be used, or the emotion vector is based on the main emotion category plus the energy scalar plus a stress scalar. The second order of tagging, which is optional, tags based on moods, emotions, subjects, or other similar attributes.

Next, the system tags track structure, which may be achieved using a clipping tool. The entire track waveform is presented with a player and a time index selector. The structure tags are then set and/or confirmed. These include beat indexes, bar indexes, beats per minute, and structure shift points if a song has more than one beat structure over its length. Next, the lyrical segments are set and/or confirmed, which identifies lyrical blocks with a start and end time segment. The segment tags are then set and/or confirmed. These include, for example, tagging the various parts of the song, such as the intro, the chorus, the verses, or any other start and stop points of the song. This also includes selecting lyrics within segment and also flagging presence of vocals. The point of interest tags may then be set and/or confirmed. These include 3-7 second segments of interest, often drops or high dynamic ranges over a short period of time. Next segments are tagged. First, the genre style or other common metadata of a song is inherited and optionally reset. Then, the 1st order tagging is parroted and optionally reset, again including emotion tagging lyrics and subject tagging. Finally, second order tagging may optionally be completed to account for moods, emotions, subjects, etc. It is noted that second order tags can look up and set first order tags.

FIG. 3 is a diagrammatic illustration of music tagging base taxonomy used within the system for converting music into segmented digital assets for dynamic uses in digital experiences 10, in accordance with the first exemplary embodiment of the present disclosure. In particular, FIG. 3 illustrates exemplary tagging characteristics including a numerical value system for identifying scalar values within songs. As previously discussed, each segment of a song is tagged. Emotion vector from that song may be extracted. For example, emotion vectors of angry, happy, relaxed, sad, they correspond to various high and low levels of energy and stress, which act as scalers. This tagging may consider logical segments of the song, such as an intro, verse, chorus, bridge, and outro, among others, and may take into account an intensity slope. As shown on the right hand side in FIG. 3, an energy scalar and a stress scalar may be provided with a numerical scale which ranges, for example, from a value of 1 indicating an extremely low value, to a value of 14, indicating an extremely high value. Accordingly, this tagging taxonomy may allow for cross segment benchmarking of emotion and emotional levels, which may make cross song segment arranging possible, as well as direct song replacement possible. In turn, this allows for the system to employ search interfaces where a user can conduct keyword searches to locate songs which match their interests or to replace an existing song with having relative attributes, e.g., such as by searching for "more angry" or "less sad" to find a song that is more angry or less sad.

With regards to handling songs that are instrumental only, i.e., without vocals, a song is uploaded to become a track and then it gets tagged, as described above. When an instrumental version of a song is uploaded and there is already an existing non-instrumental version, the system presents an alignment interface to select an alignment key between the original and the instrumental versions. This allows for adjusting the instrumental song to the same time index as the original, therefore making all tags time index compatible between versions of the song. When a song is uploaded that is instrumental, and there is no existing song within the system, the uploaded song is treated as an original.

It is noted that the extraction of emotion or musical quality from a song can be achieved manually, such as through human listeners, or it can be performed autonomously, or a combination thereof. For example, emotion extraction may include multiple algorithms processing segments for emotion and emotion intensity based on characteristics such as beat rate, high dynamic range of beats or noise level, key, and tone, and/or certain musical signatures, as well as on previously machine-learned emotions for a segment which were based on a manual tag processes. Similarly, algorithms and machine learning may also be used for segment normalization and benchmarking, where algorithms that cause tags of different segments, even from different songs, to be identified as "compatible." This supports selecting a segment, looking up its associated tags, then finding segments with same tags to receive a collection of segments that identify the same or similar emotional, style, and content story. It is possible to match one or more of the tag types to achieve the same emotion but do so without being limited to a particular musical style. It is also noted that algorithms may be used for segment linking compatibility. For example, algorithms can ascertain if different segments are musically compatible to string together end-to-end such that they sound like a cohesive composition. This may use features such as vocals, anacruses detection, intensity scaling, sonic qualities, beat positions, or others. The algorithm may drive auto-stitching of the segments into the composite composition with music without requiring crossfades or similar segues.

Figure 4:
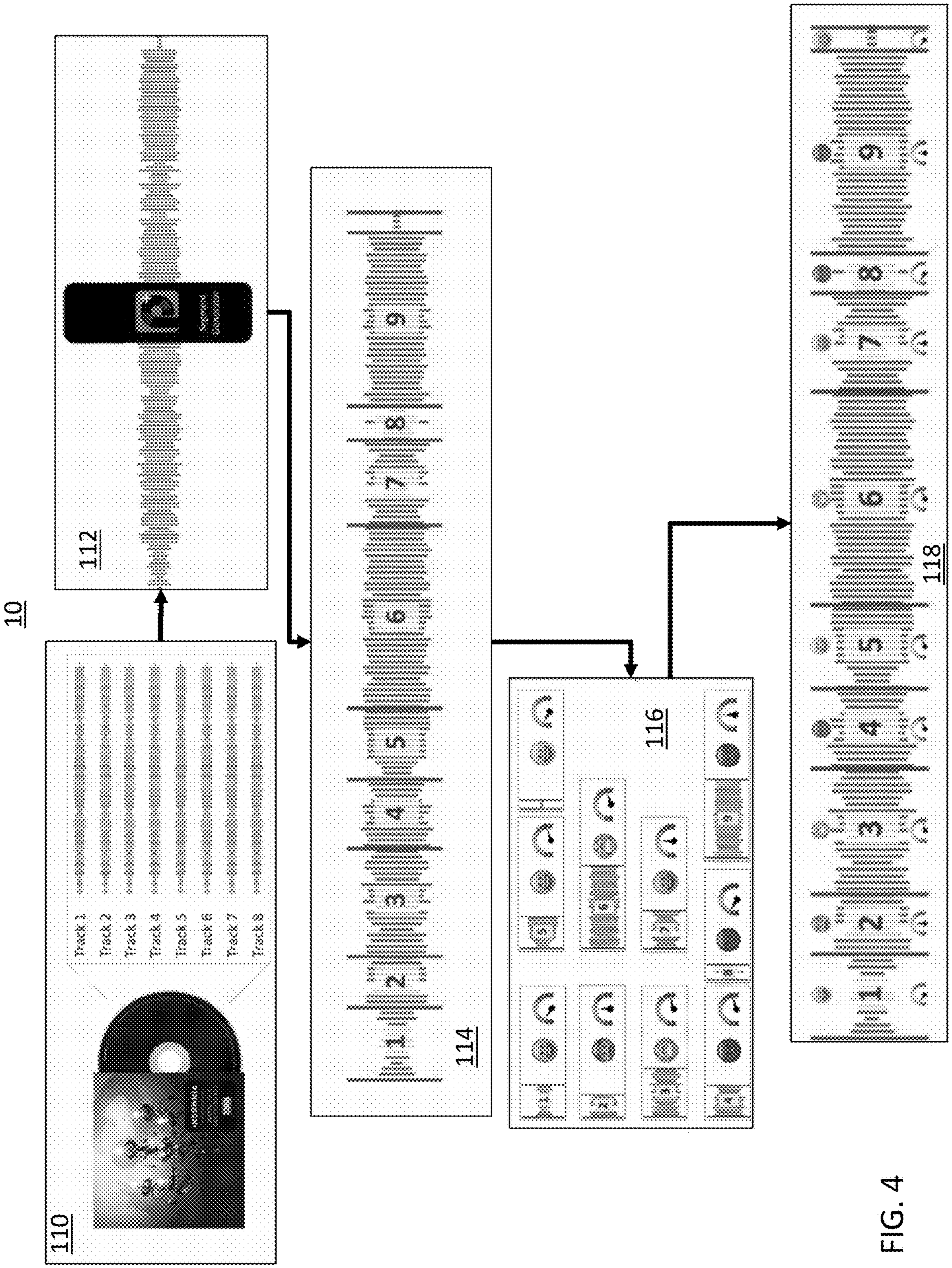
FIG. 4 is a diagrammatic illustration of generating and using a composite soundtrack based on context and event by the system, in accordance with the first exemplary embodiment of the present disclosure.
Figure 5A:
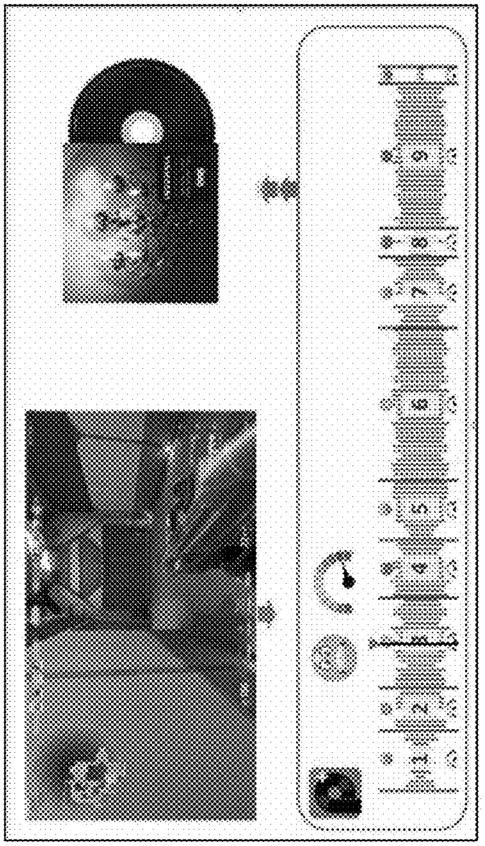
FIGS. 5A-5C are diagrammatic illustrations of a composite soundtrack corresponding to different events within a digital entertainment experience, in accordance with the first exemplary embodiment of the present disclosure.
Figure 5B:
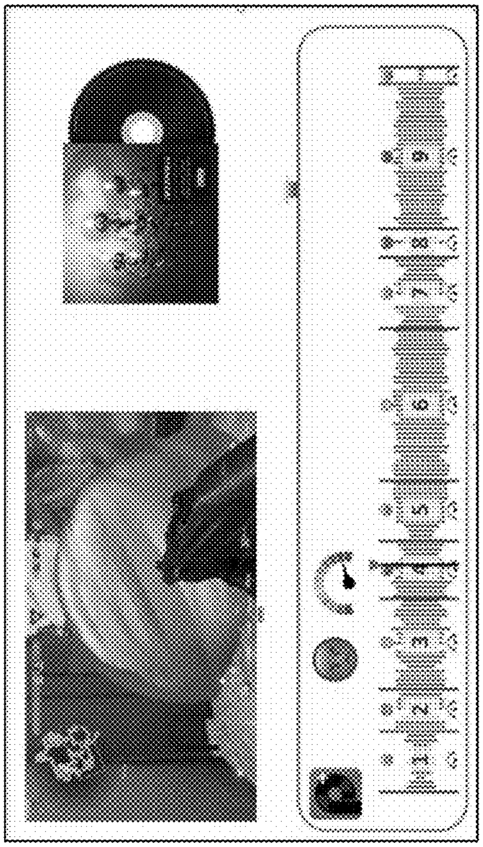
Figure 5C:
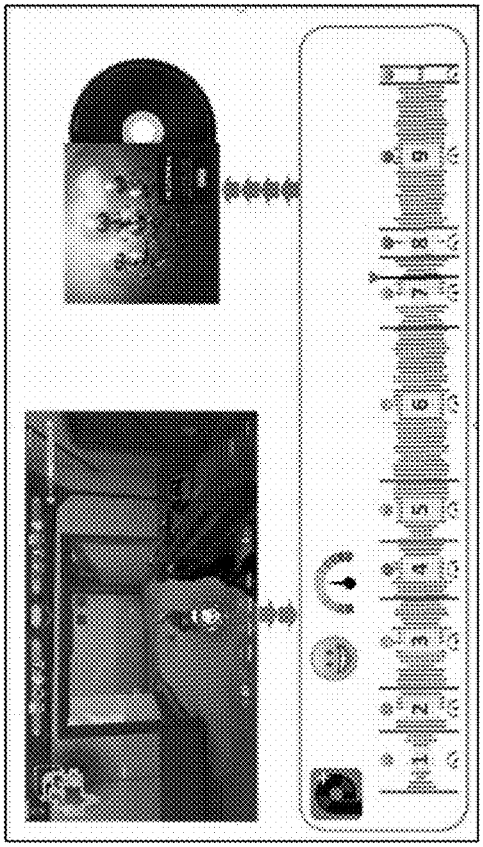

Composite Soundtrack by Context and Event:

FIG. 4 is a diagrammatic illustration of generating and using a composite soundtrack based on context and event by the system 10, in accordance with the first exemplary embodiment of the present disclosure. FIGS. 5A-5C are diagrammatic illustrations of a composite soundtrack corresponding to different events within a digital entertainment experience, in accordance with the first exemplary embodiment of the present disclosure. In particular, FIG. 4 depicts the process of creating a composite soundtrack based on context of a song and events of an entertainment experience, namely, a video game. With reference to FIG. 4, block 110 illustrates an album that is uploaded to the system 10 and has a number of tracks or songs within it. one or more of those songs is analyzed by the system, as shown at block 112, to identify segments of the song. The song in segments is depicted in block 114 where the various portions of the song are identified as discrete segments. Next, at block 116, each of the identified segments is identified as having a musical quality which correlates to an emotion, style, or vibe attribute. These are depicted as emojis within block 116, where it can be seen that certain segments have happy, chill, or low intensity emotion, style, or vibe attributes where other segments have mad, angry, stressed, or amped emotion, style, or vibe attributes. In block 118, the music quality and emotion, style, or vibe attributes of each of the segments is identified within the song on the whole.

Since each segment of the song has an identified music quality and emotion, style, or vibe attribute, the system is capable of playing any of the segments at any given time. As such, the system can coordinate playing a segment with a particular event in the video game. Examples of this are shown in FIGS. 5A-5C. In FIG. 5A, the event occurring in the video game is a high intensity event or the player is in a combat scene and moving down a hallway. The corresponding segment of the song being played is a high intensity identified segment. Next, in FIG. 5B, the event occurring in the video game is an active combat scene, and the corresponding segment being played is one where the emotion, style, or vibe attribute is anger. And in FIG. 5C, the event is after the combat scene or the player appears to have defeated his or her opponent, and the corresponding music segment is one of happiness. As can be seen, the system is fully capable of playing any of the segments at any given point in time to correspond to events in the video game. It is noted that this example uses one song, but it is possible to use many songs or many parts of different songs together in one composite soundtrack, any combination of which is considered within the scope of the present disclosure.

Figure 6:
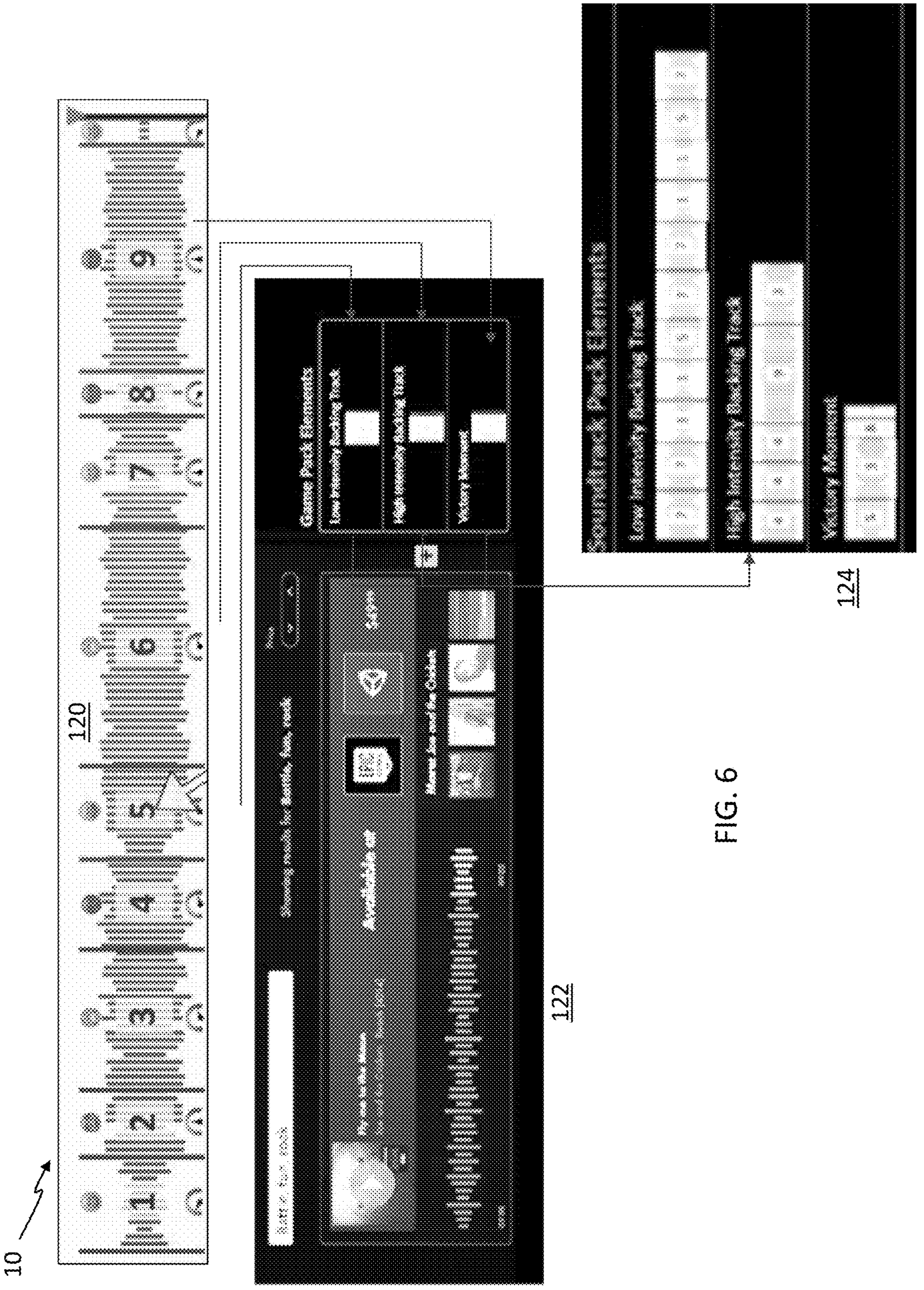
FIG. 6 is a diagrammatic illustration of generating and using a composite soundtrack based on a pre-compiled composite soundtrack by the system, in accordance with the first exemplary embodiment of the present disclosure.
Figure 7A:
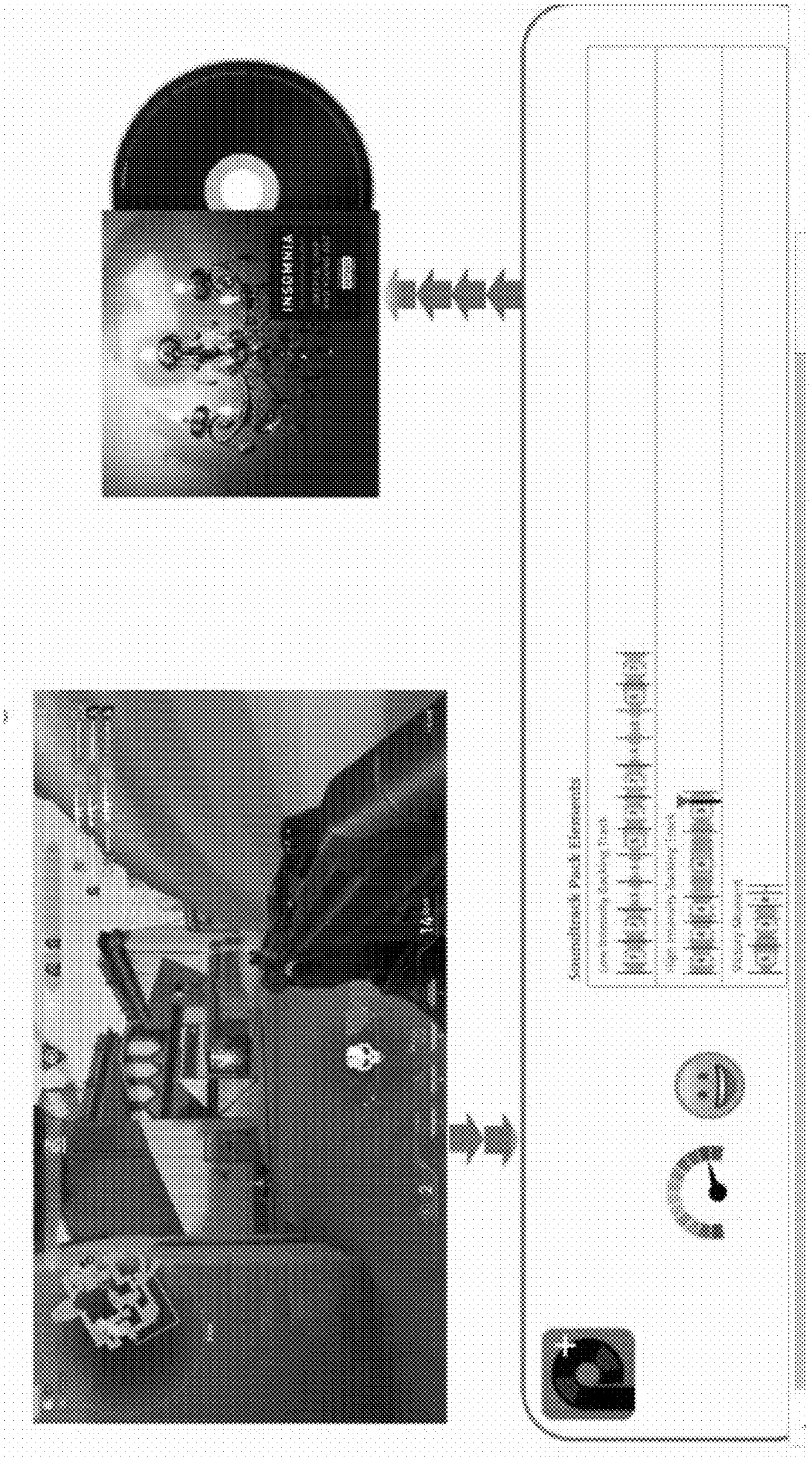
FIGS. 7A-7B are diagrammatic illustrations of a composite soundtrack corresponding to different events within a digital entertainment experience, in accordance with the first exemplary embodiment of the present disclosure.
Figure 7B:
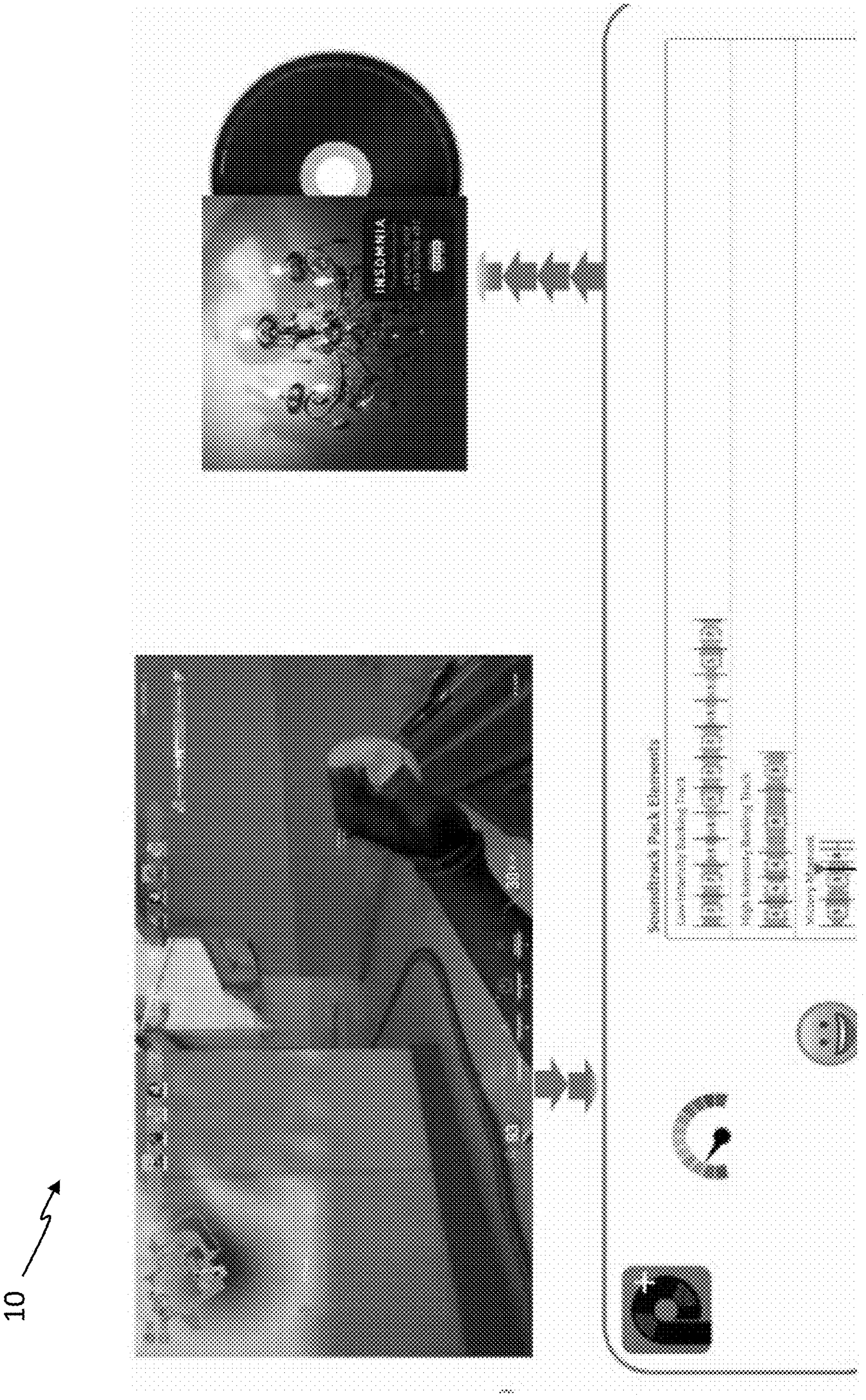

Selection of a Different Pre-Compiled Composite Soundtrack:

FIG. 6 is a diagrammatic illustration of generating and using a composite soundtrack based on a pre-compiled composite soundtrack by the system 10, in accordance with the first exemplary embodiment of the present disclosure. FIGS. 7A-7B are diagrammatic illustrations of a composite soundtrack corresponding to different events within a digital entertainment experience, in accordance with the first exemplary embodiment of the present disclosure. In particular, FIG. 6 depicts the process of creating a composite soundtrack based on an already existing composite soundtrack, such that a customized soundtrack can be pre-generated and dynamically responsive to events within a game period. In this situation, game developers can describe the soundtrack needs of different events within their game and the system can generate a composite soundtrack. As shown in block 120, the system includes a song that's been segmented as a composite soundtrack, where the various segments of the song are identified with music qualities and emotion, style, or vibe attributes. The game developer may identify the various desired elements of the soundtrack for their game, such as by identifying where game pack elements occur within their game, e.g., low intensity tracks, high intensity tracks, etc., as shown in block 122. The system can take the identified elements by the developer and dynamically generate a new soundtrack by matching the previously identified segments of a song with the elements identified by the developer. The system can then output the new composite soundtrack to be used with the game with the segments identified with their corresponding or matching game event elements.

As shown in FIG. 7A, during an event within the game where the player is in an active combat situation, the corresponding segment of the song being played is a high intensity backing track. As can be seen, the system can select from various segments that all correspond to high intensity backing tracks. In FIG. 7B, the event of the game is after the player has defeated an opponent, where the corresponding segment of the song being played corresponds to a victory moment. Again, the system can choose from one of a number of different victory moment identified segments. Since the process described herein can occur dynamically, in real time or in near real time, it is possible for the system to create a virtually unlimited number of different soundtracks for the same game. It is also possible for the system to self-recognize events within gameplay from the game code, either natively or using an image-analyzing "scrapper" to extract or extrapolate the events occurring in the gameplay. The system can use these recognized events to automatically generate a dynamic composite soundtrack for the game. This process may use various computing techniques, including machine learning, artificial intelligence, or similar autonomous processing methods.

With the functionality of the system as described relative to FIGS. 4-7B, it is noted that the system 10 may be configured to allow for users to access the databases or libraries of composite soundtracks. These users may be game developers, game players, or other users who wish to create or adjust a soundtrack for a game. In this regard, the user may access the server 12 with the stored data, namely the songs which have been uploaded to the system. The user may then select one or more of the songs to be used in a soundtrack. The events within the game may then be mapped to various emotion, style, or vibe attributes, either by being manually defined by the game developer, by the system using a pre-compiled composite soundtrack already in use with the game, or autonomously by the system based on the detection of events within the game, or by another method. The system can then construct the composite soundtrack from segmented portions of the song based on the music quality and emotion, style, or vibe attributes of those identified segmented portions, as previously discussed. The composite soundtrack can then be output to the game, which may occur by downloading the soundtrack to a local computer, streaming the soundtrack through a network connection, or using a plugin or API to otherwise provide the soundtrack such that it can be played during gameplay.

Figure 8:
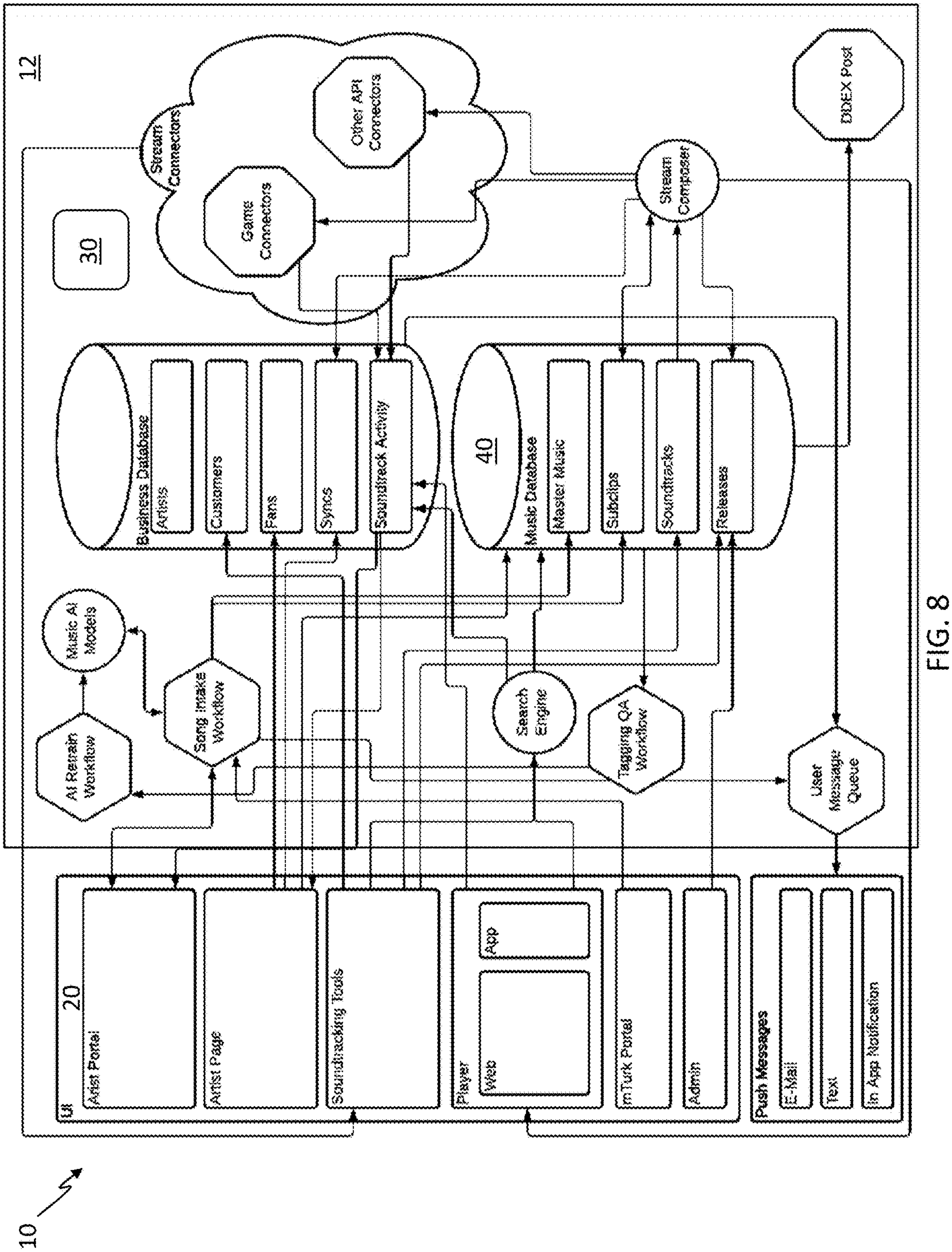
FIG. 8 is a diagrammatic illustration of the functionality and architecture of the system, in accordance with the first exemplary embodiment of the present disclosure.
Figure 9A:
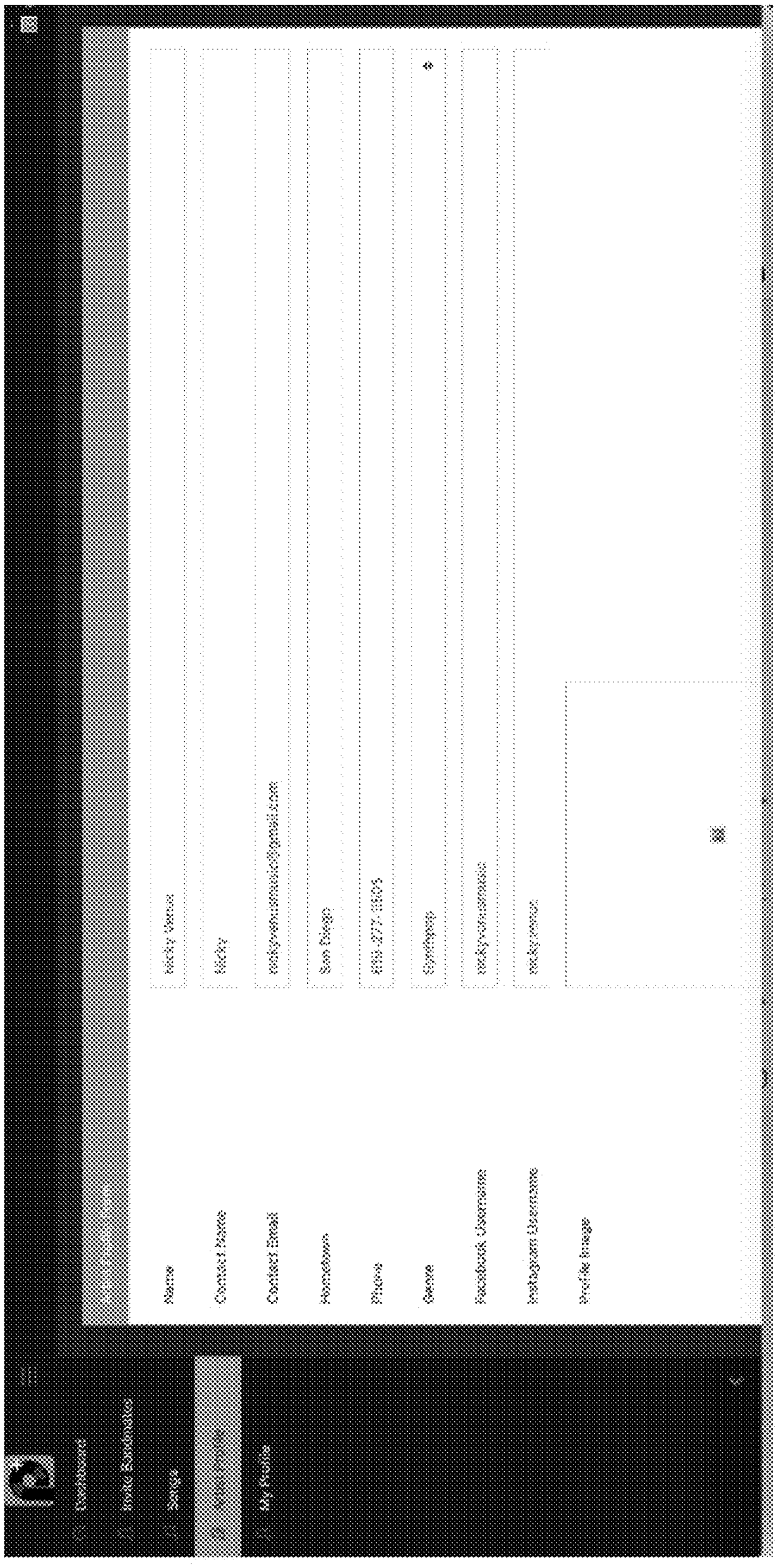
FIGS. 9A-9B are exemplary interfaces of the artist profile within the system, in accordance with the first exemplary embodiment of the present disclosure.
Figure 9B:
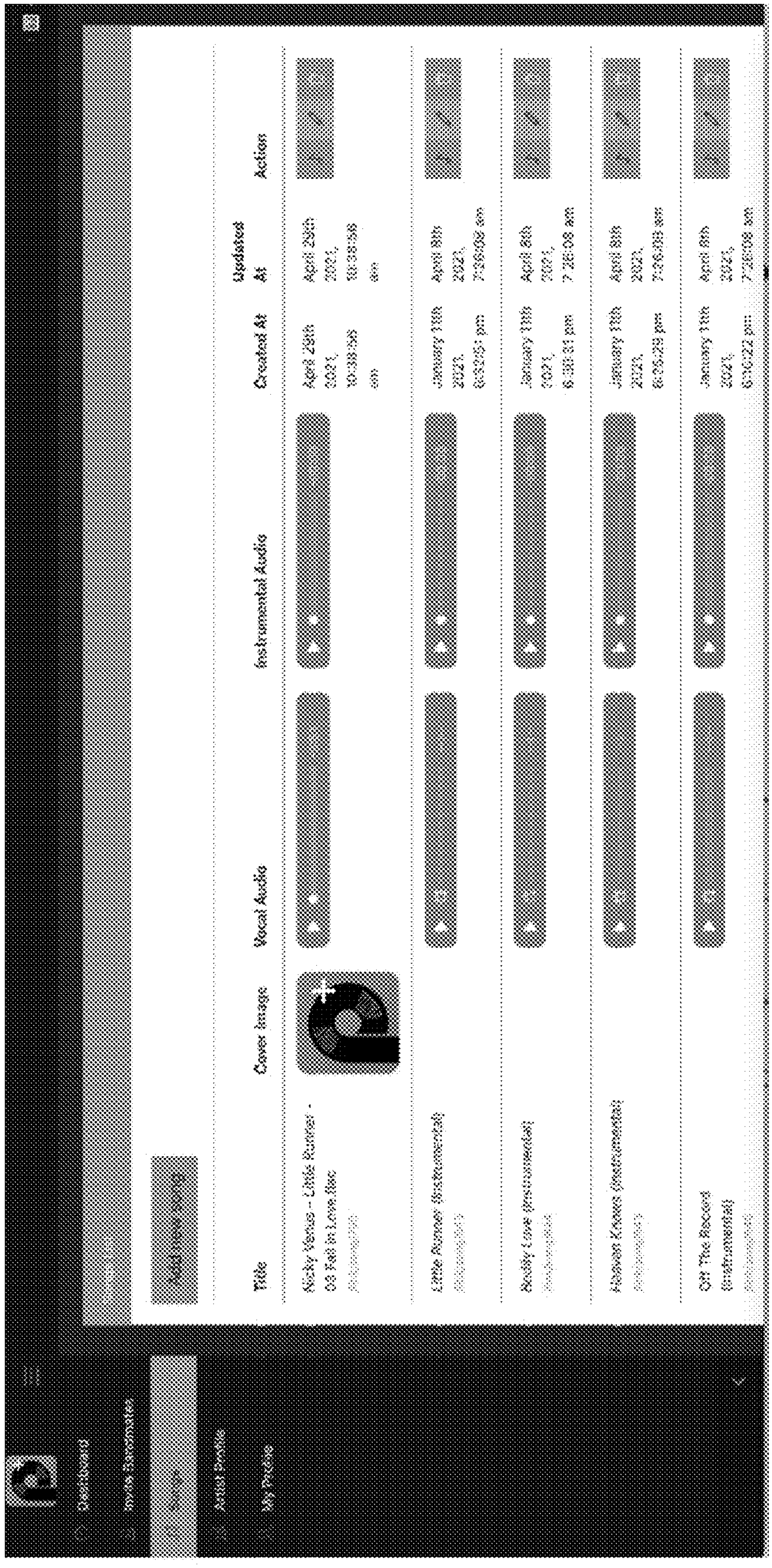

FIG. 8 is a diagrammatic illustration of the functionality and architecture of the system 10, in accordance with the first exemplary embodiment of the present disclosure. As shown, the system 10 generally includes a user interface 20 and a server 30 having at least one database 40. The user interface 20 includes an artist portal which is used by the artist to access an artist page, an example of which is depicted in FIG. 9A. The user interface 20 may also include a module containing the soundtracking tools, as well as a music player having both web and application capabilities. An example of the artists profile for adding songs and playing songs on the system is depicted in FIG. 9B. Other portals that may be included in the user interface include those for administration, employees, or crowd-working contributions to the system 10. The server 12 includes a processor 30 which is capable of executing computing functions as identified in FIG. 8 and discussed herein.

The processor 30 may be in communication with various databases such as a music database 40 and a business database. The databases may contain data stored in the system 10, for example, in the business database, data about artists, customers, fans, syncs, and soundtrack activity, end the music database, master music data, subclips, soundtracks, and releases. The system may also include various input or output devices such as a network connection to communicate user computers, with games directly, or with other applications through API connectors. This connection may allow for the communication of data concerning the system such as reporting the use and quantity of music play, for payment by the game developer or user, for payment to the artist, and/or connecting a user of the system to an artist through a social network or similar platform. A communication module may also be used to communicate to users through email, text, or in-app notifications. The system 10 may also have an interface which allows for interaction with the user within the game or entertainment experience itself, such that the player of the game can interact with the system 10 without leaving the game.

Figure 10A:
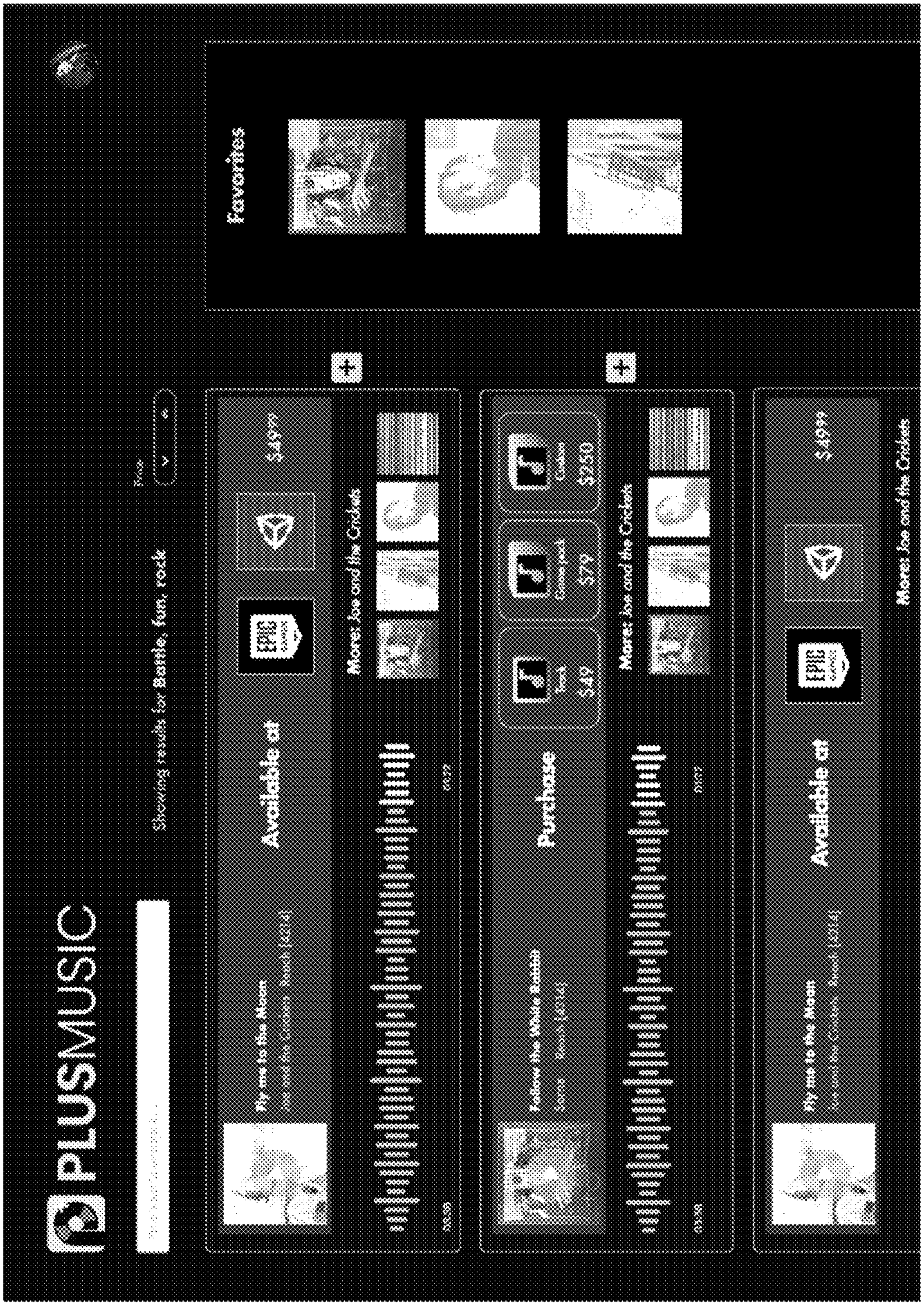
FIGS. 10A-10B are exemplary interfaces within the system to search, configure, or purchase soundtracks, in accordance with the first exemplary embodiment of the present disclosure.
Figure 10B:
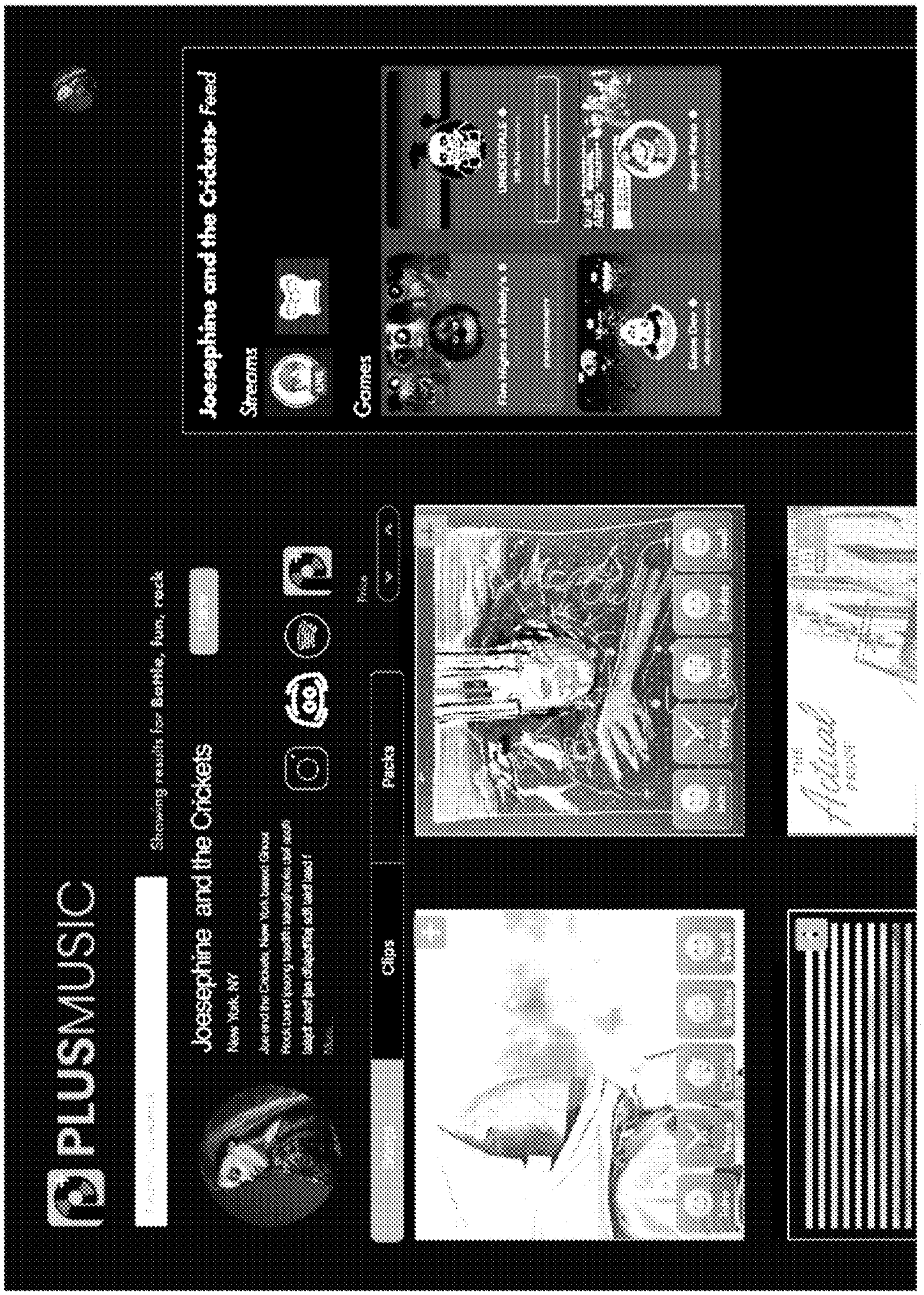

FIGS. 10A-10B depict various interfaces for use by a user who desires to use the system to configure or purchase soundtracks, and in particular, search for music that form a composite soundtrack from. As shown in FIG. 10A, the system may provide a search query tool where a user can enter keyword searches to locate specific songs. This search functionality may provide contextual search results for people looking to buy soundtrack, such as a game developer, a video editor, or streamer. It can also be used by fans to find music or particular artists, or the fans can search for emotion tracks within an artist catalog or emotion soundtracks generally.

The search tool may allow users to search by various parameters, such as by keyword, or by a filtering tool, among others. For instance, a user can search based on emotion, subject, or style and receive a list of clips back. The clips may be interesting portions of a song such as those being 10 to 15 seconds long which matched the query. In the example of FIG. 10A, the search tool has received the words "battle", "fun" and "rock" and displays these snippets or "musical thumbnails" of the songs, as well as providing identifying information related to the song. This information may include the name of the song, the name of the artist, where the song is available for purchase, a price of the song, and more songs from the same artist. It may also include the ability to play a song with a specialized audio player, where the user can play an audio clip or a soundtrack stream where the user can adjust the music characteristics, such as by dialing up or down elements in the soundtrack. The player may allow the user to easily navigate and plan an original song that the soundtrack is built upon and explore an artist's page. The user can also search for further playlists or other channels, and they can export a mix as a soundtrack for release, later playback, or other uses. When a user selects a song or selects an artist, a more detailed page may be displayed, as shown in FIG. 10B.

It is noted that an elastic search synonym plugin may also be used for turn-key emption words to the system's taxonomy mapping, but save the original word requested in a log for later direct-tagging. The user can drop clips into their Projects/Playlist builder, can dial-up and dial-down energy and stress scalers to refine search return, i.e., "Even happier" or "Even more angry", can select a clip to be final for the section, and can select for a clip to be stretched.

Additionally, the search query tool may allow someone to iteratively build up a store of soundtracks that they're interested in. For instance, someone can have a "My Project" virtual container to drop soundtrack candidates into for buyers of music. There can also be a "My Playlists" virtual container to drop soundtrack candidates into for fans of music, e.g., playlists such as "workout" or "road trip" etc.

The search tool may also be a purchasing support tool. For example, for buyer-type users, they are pre-buying soundtracks for their project, then using the search tool over time to iterate on possible soundtrack "seeds". Once they have the sound they like, they can finalize their selection, such as by selecting the clip and getting the song as-is in exchange for a pre-purchased credit, or selecting the clip but specify adjustments, such as length, stringing multiple clips together, etc. If the specified adjustments can be automatically made, a smaller "customization price" can be ascribed which requires more credits to be purchased, whereas if the specified adjustments must be made manually by the system, a larger "customization price" can be ascribed with requires more credits to be purchased. When customization is selected, the system's workflow will ensure it is completed, such as by employees of the system that use editor tools, by connecting the artist themselves to custom make a song to fulfill the requested soundtrack, or with another approach. When a soundtrack is finalized, either customized or not, it is released and given a unique ID and bound to the media it is connected to which also gets a unique ID. Additionally, a finalized soundtrack may be attached to the originally intended project, and also cross promoted. This may include conducting a launch campaign for artists and promote the released game, video, or other entertainment experience, or a launch campaign for buyer to promote the artists, among others.

Figure 11:
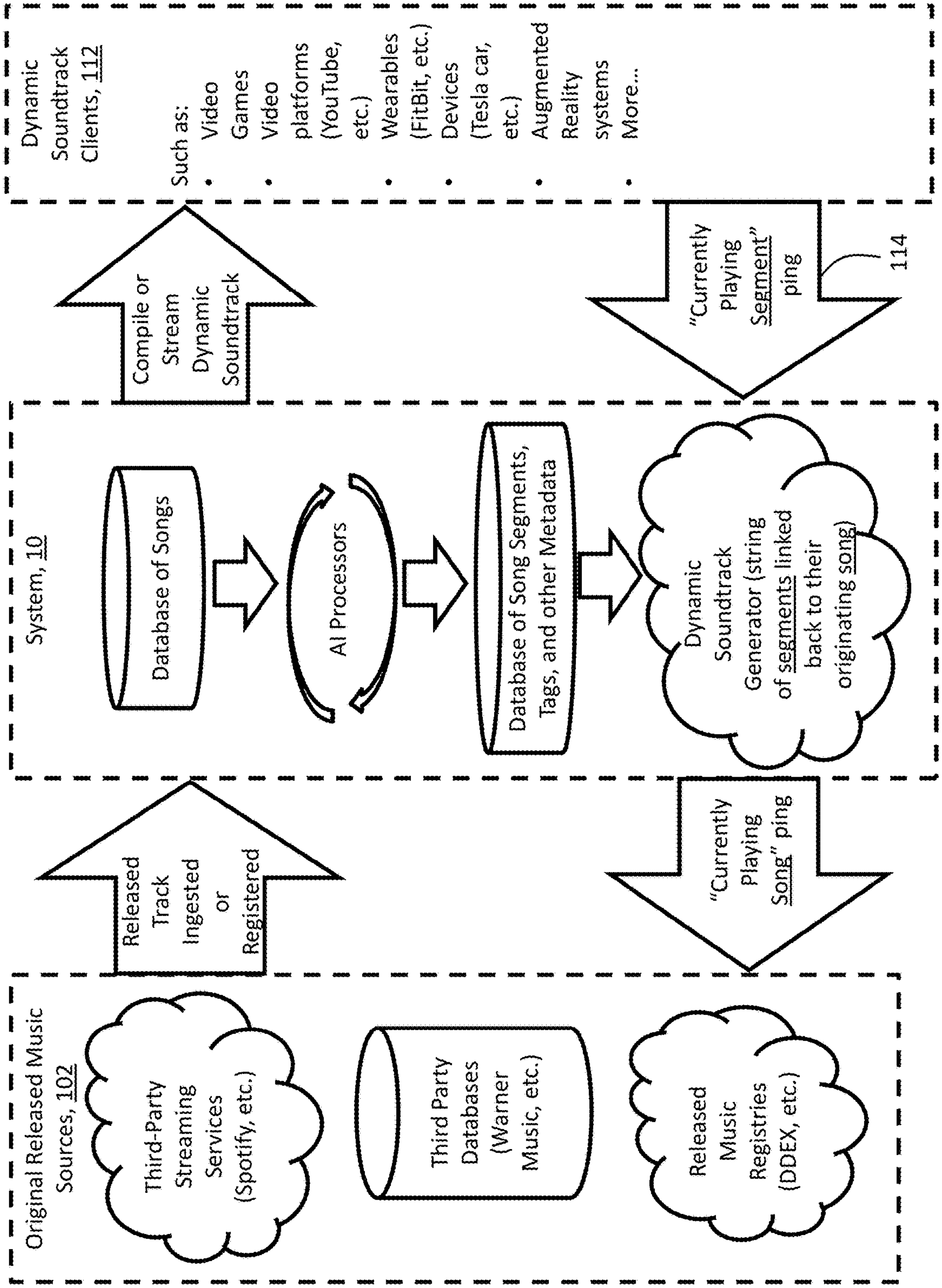
FIG. 11 is a diagrammatical illustration of the functionality and architecture of a back-linking portion of the system, in accordance with the first exemplary embodiment of the present disclosure.

FIG. 11 is a diagrammatical illustration of the functionality and architecture of a back-linking portion of the system 10, in accordance with the first exemplary embodiment of the present disclosure. In particular, FIG. 11 depicts the ability for back-linking, where a user who has, or is currently listening to a segment of a song can find or gain access to the song from which the segment is derived. As previously described, the system 10 includes a database of songs, or a stream of songs, which are processed either manually or through computing algorithms. In the example of FIG. 11, the songs are processed using artificial intelligence processors, in the process songs are stored in a database of song segments, tags, and other metadata. This data is used to generate the dynamic composite soundtrack by stringing segments together.

As can be seen, the system 10 is in communication with other systems and databases, for example, a system with original released music sources 102 and a system which connects to dynamic soundtrack clients 112. As can be seen, a user within the dynamic soundtrack client block 112 can be currently listening to a segment of a song. When the segment of the song is played the system 10 may receive a ping at 114. The ping from 114 is received by the system 10, which communicates with the original released music sources 102 to connect the user to the song from which the segment is derived. This may include connecting the user to a third party streaming service, a third party database having the song, or released music registries, among other possible sources. These sources can provide the particular song back to the system 10, where it is ingested or registered, in can be linked to the user specifically. For example, the particular song that the user like a segment from can be communicated to the user such that the user can listen to that song, such as by streaming it or purchasing it.

Additionally, that song can be used to further compile or stream a dynamic soundtrack to that user, whereby the system 10 recognizes that the users interest in that segment can be used to build further soundtracks for that user. The system 10 can also generate is dynamic soundtracks for various activities with which the user is engaged. For example, for a user who is playing a video game and finds a segment of a soundtrack that they like, the system 10 can compile a new soundtrack based on the artist of that segment to be used by the user for exercise, driving, or other activities apart from a video game.

It is noted that the system 10 can utilize Artificial Intelligence (AI), as well as machine learning, neural networks, or other automated computer processing techniques to perform some or all of the functionality described herein. For example, a neural network can be used to determine if a segment is loop-able, or if a segment is cut right for a good transition point. The neural net can be trained to judge what a good transition sounds like, and then it can synthesize a loop or a transition with a set of candidate transition points, whereby the neural net can determine which point the best transition point is from these synthesized transitions. This use of the neural network can avoid jarring transitions between segments that will not make sense to a consumer. Additionally, AI processing can be used in equalization and volume normalization. Once segments are identified for transition, the EQ and volume can be adjusted so the segment is seamless. This can be done in a similar fashion to as described herein relative to neural networks with segment looping. The neural network is trained on what acceptable volume/EQ differences are, and then once all segments for a game are identified, it is possible to create all transitions, and create normalization and EQ info for each segment from that.

Along with the deterministic methods of identifying musical segments, machine learning (ML) can be employed to derive additional methods of identifying segments. This is accomplished by feeding manually edited soundtrack cut-points along with the original contributing song files and transforms thereof for machine learning infer "best cut-points" using the manually re-cut music as a "crowdsourced opinion" of what makes a point in music a sensible cut-point, and what causes two originally separate musical elements to be compatible with one-another. Both ML and neural networks are used to feed in many different "sonic features" extracted from the original song including onset density, onset patterns, volume, presence of certain sonic elements such as frequency ranges, voices, and baselines as further correlation data elements to surround the cut-points "professionally selected" by the human editor of the input training set.

For the extraction of emotion from a segments in an automated way, the system 10 may send segments to a plurality of automated processors and people, including the original artists, fans of the artists, and random people via a Mechanical Turk workflow system and user screens for collecting human input of type emotion, subject, and other tags. When two or more automated and/or human inputs are made, if all votes are the same or similar, that segment is authoritatively tagged and placed into a ML and Neural-Net Training Set for the creation of new AI versions that can infer what sonic features of the segment correlate to the selected tag in the same manner as the segment extractor training process.

End-user selections of segments in the search engine can generate a signal around which segments are popular and interesting and correlate that to search terms indicating intention of user are logged and serve to further train AI models using these logs as crowdsourced opinions of both popularity and connection of that segment to the intention of the user. In-digital the experience, the system 10 will output event data from the digital experience to infer what rules the developer used to connect event to soundtrack state selection to crowdsource the visual and experience (game) states that surround transition points. This training set trains models of AI that can take running game state in the form of visual analysis and direct data log output from the experience (such as health, steps, power meter, etc.) and correlate such experience states to soundtrack cut-points and transitions to affectual the creation of an AI engine that can auto-connect segment switch events to the soundtrack.

While the system is described herein in relation to digital entertainment experiences, namely video games, the system may have applicability in many other fields. For example, the system can be used with personal electronic devices that measure characteristics of the human body through telemetry, such as heart rate. Accordingly, it is possible for the system to be used in conjunction with these electronic devices to affectively provide composite soundtracks to nondigital experiences, such as exercise or athletics.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure, particularly, any "preferred"

embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method for converting music into segmented digital assets for dynamic uses in a digital entertainment experience, the method comprising:

uploading at least one digital music file, or pointing to a database having the at least one digital music file, to a computerized system, the at least one digital music file having at least one song;

processing, with a computerized processor of the computerized system, the at least one digital music file to identify segmented portions of the at least one song;

separating the at least one song into the segmented portions;

analyzing the segmented portions of the at least one song to identify at least one musical quality of each of the segmented portions, wherein an emotion, style, or vibe attribute is correlated to each of the segmented portions based on the at least one musical quality identified;

analyzing a digital entertainment environment having a visual component to identify at least one event occurring in and coming from the digital entertainment environment and depicted in the visual component;

constructing a composite soundtrack from the segmented portions by arranging at least a portion of the segmented portions in a composite order, wherein the composite order is irrespective of an original chronological order of the segmented portions of the at least one song, and is based on the emotion, style, or vibe attribute correlated with each of the segmented portions arranged relative to the at least one event occurring in and coming from the digital entertainment environment having the visual component; and playing at least a portion of the composite soundtrack and the visual component of the digital entertainment environment, wherein the portion of the composite soundtrack accompanies and is played based on the at least one event occurring in the digital entertainment environment.

2. The method of claim 1, further comprising constructing at least one additional composite soundtrack from the segmented portions by re-arranging at least a portion of the segmented portions of the at least one song based on the emotion, style, or vibe attribute correlated with each of the segmented portions, wherein the at least one additional composite soundtrack is used with the digital entertainment environment in a period of time that is different from when the composite soundtrack is used within the digital entertainment environment.

3. The method of claim 1, further comprising dynamically adjusting the composite soundtrack, whereby one of a plurality of segmented portions correlated to the emotion, style, or vibe attribute is playable within the composite soundtrack in substantially real-time.

4. The method of claim 1, wherein the digital entertainment environment further comprises an electronic game.

5. The method of claim 1, further comprising providing at least one link within the digital entertainment environment, the link being associated with the composite soundtrack, wherein at least one link is electronically connectable to a third party database having the at least one song.

6. The method of claim 1, wherein using the composite soundtrack within the digital entertainment environment further comprises streaming, in real-time, the composite soundtrack through a network connection, wherein the composite soundtrack is stored in a remote location from the digital entertainment environment.

7. The method of claim 1, wherein processing the at least one digital music file to identify the segmented portions of the at least one song further comprises segmenting the at least one song based on at least one of: a beat of the at least one song; a bar of the at least one song; a tempo of the at least one song; or a musical transition within the at least one song.

8. The method of claim 1, wherein analyzing the segmented portions of the at least one song to identify at least one musical quality of each of the segmented portions further comprising identifying at least one of:

a musical style of the segmented portion;

specific or composite intensity including density of onsets, volume level or composition complexity score;

a vocal presence within the segmented portion;

an instrumental presence within the segmented portion;

a volume level within the segmented portion; or a tempo of the segmented portion.

9. A method of providing a composite soundtrack for use in a digital entertainment experience, the method comprising:

providing a computerized system having a database storing a plurality of digital music files' time-index attributes, each of the plurality of digital music files having at least one song;

selecting, by a user, one or more songs to be used to generate a soundtrack for a visual digital entertainment environment;

mapping a plurality of events within the visual digital entertainment environment to a plurality of emotion, style, or vibe attributes, respectively, wherein the plurality of events are occurring in and coming from the digital entertainment environment;

constructing a composite soundtrack from segmented portions of the one or more songs, the segmented portions being selected based on at least one musical quality therein, wherein at least one of the segmented portions is correlated to each of the plurality of emotion, style, or vibe attributes to form the composite soundtrack from an arrangement of the segmented portions in a composite order, wherein the composite order is irrespective of an original chronological order of the segmented portions of the one or more songs, wherein the segmented portions are arranged relative to at least one of the events of the plurality of events occurring in and coming from the digital entertainment environment having the visual component; and outputting at least a portion of the composite soundtrack, which accompanies and is played based on at least one event of the plurality of events within the visual digital entertainment environment.

10. The method of claim 9, wherein the visual digital entertainment environment further comprises an electronic game.

11. The method of claim 9, wherein outputting the composite soundtrack to be played within the visual digital entertainment environment further comprises at least one of:

streaming, in real-time, the composite soundtrack through a network connection, wherein the composite soundtrack is stored in a remote location from the visual digital entertainment environment; or downloading the composite soundtrack through the network connection to the visual digital entertainment environment.

12. The method of claim 9, wherein mapping the plurality of events within the visual digital entertainment environment to the plurality of emotion, style, or vibe attributes, respectively, is determined based on a predetermined correlation of the plurality of events within the visual digital entertainment environment to the plurality of emotion, style, or vibe attributes, wherein the predetermined correlation is defined by a developer of the visual digital entertainment environment.

13. The method of claim 9, wherein mapping the plurality of events within the visual digital entertainment environment to the plurality of emotion, style, or vibe attributes, respectively, is determined based on analysis of a preexisting soundtrack for the visual digital entertainment environment, wherein the plurality of emotional, style, or vibe attributes is identified within the preexisting soundtrack.

14. The method of claim 9, wherein the composite soundtrack is dynamically adjustable, whereby one of a plurality of segmented portions correlated to one of the plurality of emotion, style, or vibe attributes is playable within the composite soundtrack in substantially real-time.

15. The method of claim 9, further comprising providing at least one link within the visual digital entertainment environment, the link being associated with the composite soundtrack, wherein at least one link is electronically connectable to a third party database having the at least one song.

16. A method for converting music into segmented digital assets for dynamic uses in a digital entertainment experience, the method comprising:

processing, with a computerized processor of the computerized system, at least a first digital music file or a stream of the first digital music file to identify segmented portions of at least one song within the first digital music file;

separating the at least one song into the segmented portions;

analyzing the segmented portions of the at least one song to identify at least one musical quality of each of the segmented portions, wherein an emotion, style, or vibe attribute is correlated to each of the segmented portions based on the at least one musical quality identified;

processing, with the computerized processor of the computerized system, at least a second digital music file or a stream of the second digital music file to identify segmented portions of at least one song within the second digital music file which matches an emotion, style, or vibe attribute of at least one segmented portion of the first digital music file;

analyzing a digital entertainment environment having a visual component to identify at least one event occurring in and coming from the digital entertainment environment and depicted in the visual component;

constructing a composite soundtrack from the segmented portions of the first and second digital music files by arranging the segmented portions in a composite order, wherein the composite order is irrespective of an original chronological order of the segmented portions of the at least one song, and is based on the emotion, style, or vibe attribute correlated with each of the segmented portions arranged relative to the at least one event occurring in and coming from the digital entertainment environment having the visual component; and playing at least a portion of the composite soundtrack and the visual component of the digital entertainment environment, wherein the portion of the composite soundtrack accompanies and is played based on the at least one event occurring in the digital entertainment environment.

17. The method of claim 16, further comprising the step of iteratively searching for additional digital music files which have segments which match the emotion, style, or vibe attribute of at least one segmented portion of the first or second digital music files, wherein the composite soundtrack is constructed from segmented portions of the first, second, and additional digital music files.

* * * * *